US012526395B2

(12) United States Patent
Duijnhouwer et al.

(10) Patent No.: US 12,526,395 B2
(45) Date of Patent: Jan. 13, 2026

(54) METHODS FOR CONTROLLING PERFORMANCE OF EXTENDED REALITY DISPLAY SYSTEMS

(71) Applicant: MAGIC LEAP, INC., Plantation, FL (US)

(72) Inventors: Jacobus Duijnhouwer, Fort Lauderdale, FL (US); Björn Nicolaas Servatius Vlaskamp, Plantation, FL (US); Kevin Richard Curtis, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/715,643

(22) PCT Filed: Dec. 1, 2022

(86) PCT No.: PCT/US2022/080779
§ 371 (c)(1),
(2) Date: May 31, 2024

(87) PCT Pub. No.: WO2023/102500
PCT Pub. Date: Jun. 8, 2023

(65) Prior Publication Data
US 2025/0240400 A1 Jul. 24, 2025

Related U.S. Application Data

(60) Provisional application No. 63/285,051, filed on Dec. 1, 2021.

(51) Int. Cl.
H04N 13/327 (2018.01)
H04N 13/194 (2018.01)
(Continued)

(52) U.S. Cl.
CPC ......... *H04N 13/327* (2018.05); *H04N 13/194* (2018.05); *H04N 13/344* (2018.05); *H04N 13/383* (2018.05); *H04N 13/398* (2018.05)

(58) Field of Classification Search
CPC .. H04N 13/327; H04N 13/194; H04N 13/344; H04N 13/383; H04N 13/398
(Continued)

(56) References Cited

U.S. PATENT DOCUMENTS 11,079,596 B2 * 8/2021 Hua ............... G02B 26/004
2004/0174496 A1 * 9/2004 Ji ................ G06F 18/2431
351/209
(Continued)

OTHER PUBLICATIONS

PCT International Search Report and Written Opinion for International Appln. No. PCT/US22/80779, Applicant Magic Leap, Inc., dated Feb. 16, 2023.
(Continued)

*Primary Examiner* — Tung T Vo
(74) *Attorney, Agent, or Firm* — Vista IP Law Group, LLP

(57) ABSTRACT

Systems, methods, and computer program products for displaying virtual contents using a wearable electronic device determine the location of the sighting centers of both eyes of a user wearing the wearable electronic device and estimate an error or precision for these sighting center. A range of operation may be determined for a focal distance or a focal plane at the focal distance based at least in part upon the error or the precision and a criterion pertaining to vergence and accommodation of binocular vision of the virtual contents with the wearable electronic device. A virtual content may be adjusted into an adjusted virtual content for presentation with respect to the focal plane or the focal distance based at least in part upon the range of
(Continued)

operation. The adjusted virtual content may be presented to the user with respect to the focal distance or the focal plane.

18 Claims, 23 Drawing Sheets

(51) Int. Cl.
  *H04N 13/344* (2018.01)
  *H04N 13/383* (2018.01)
  *H04N 13/398* (2018.01)
(58) Field of Classification Search
  USPC .......................................................... 348/51
  See application file for complete search history.

(56) References Cited

U.S. PATENT DOCUMENTS

| | | | | |
|---|---|---|---|---|
| 2012/0002163 | A1* | 1/2012 | Neal | G02B 13/22 |
| | | | | 351/239 |
| 2017/0123489 | A1* | 5/2017 | Guenter | A63F 13/213 |
| 2017/0269367 | A1* | 9/2017 | Qin | G06F 1/163 |
| 2018/0011533 | A9 | 1/2018 | Marggraff et al. | |
| 2018/0025520 | A1* | 1/2018 | Huang | G06F 3/013 |
| | | | | 345/633 |
| 2018/0032133 | A1* | 2/2018 | Cho | G06F 3/013 |
| 2018/0295350 | A1* | 10/2018 | Liu | G06F 3/013 |
| 2019/0243448 | A1 | 8/2019 | Miller et al. | |
| 2020/0319466 | A1 | 10/2020 | Welch et al. | |
| 2021/0271091 | A1* | 9/2021 | Xu | G02B 27/0179 |

OTHER PUBLICATIONS

PCT Preliminary International Report on Patentability for International Appln. No. PCT/US22/80779, Applicant Magic Leap, Inc., dated May 2, 2024.
Partial European Search Report for EP Patent Appln. No. 22902410.4 dated Oct. 6, 2025.
Foreign OA for JP Patent Appln. No. 2024-532448 dated Nov. 13, 2025.

* cited by examiner

METHODS FOR CONTROLLING PERFORMANCE OF EXTENDED REALITY DISPLAY SYSTEMS

CROSS REFERENCE TO RELATED APPLICATION(S)

This application claims priority to PCT Application No. PCT/US2022/080779 filed on Dec. 1, 2022, which claims priority to U.S. Prov. Pat. App. Ser. No. 63/285,051 entitled "METHODS FOR CONTROLLING PERFORMANCE OF EXTENDED REALITY DISPLAY SYSTEMS" and filed on Dec. 1, 2021. This application is also cross related with the following patent applications: U.S. patent application Ser. No. 14/205,126, filed on Mar. 11, 2014; U.S. patent application Ser. No. 14/212,961, filed on Mar. 14, 2014; U.S. patent application Ser. No. 14/331,218, filed on Jul. 14, 2014; U.S. patent application Ser. No. 14/555,585, filed on Nov. 27, 2014; U.S. patent application Ser. No. 14/690,401, filed on Apr. 18, 2015; U.S. patent application Ser. No. 14/738,877, filed on Jun. 13, 2015; and U.S. patent application Ser. No. 16/215,477, filed on Dec. 10, 2018. The contents of the patent applications mentioned herein are fully incorporated by reference for all purposes.

FIELD OF THE INVENTION

The present disclosure relates to extended reality (i.e., virtual reality, augmented reality, and/or mixed reality) imaging, visualization, and display systems and methods.

BACKGROUND

Modern computing and display technologies have facilitated the development of "extended reality" (XR) systems for so called "virtual reality" (VR), "augmented reality" (AR), or "mixed reality" (MR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). A MR scenario typically involves presentation of digital or virtual objects that interact with real world objects. Accordingly, AR and MR scenarios involve presentation of digital or virtual image information with transparency to the real-world visual input.

XR systems typically generate and display color data, which increases the realism of XR scenarios. Many of these XR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color XR scenario in a user's mind.

Various optical systems generate images, including color images, at various depths for displaying XR (VR, AR, and MR) scenarios. Some such optical systems are described in U.S. Utility patent application Ser. No. 14/555,585 filed on Nov. 27, 2014, the contents of which have been previously incorporated by reference herein.

XR systems typically employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated to take the change in head pose (i.e., the orientation and/or location of user's head) into account.

Head-worn display devices that enable AR and MR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in XR systems, optically render virtual content. Content is "virtual" in that if does not correspond to real physical objects located in respective positions in space. Instead, virtual content only exists in the brains (e.g., the optical centers) of a user of the head-worn display device when stimulated by light beams directed to the eyes of the user. XR systems attempt to present color, photo-realistic, immersive XR scenarios.

The visualization center of the brain gains valuable perception information from the motion of both eyes and components thereof relative to each other. Vergence movements (i.e., movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic XR configurations, is known to produce eye fatigue, headaches, or other forms of discomfort in users.

Due to the complexity of the human visual perception system, it is challenging to produce an XR technology that facilitates a comfortable, natural-feeling, rich presentation of virtual image elements amongst other virtual or real-world imagery elements. For instance, three-dimensional (3D) image display systems can cause users to experience the vergence-accommodation conflict problem. This problem occurs when two optical depth related biological processes send conflicting depth signals to a viewer/user's brain. Vergence relates to the tendency of the viewer's eye(s) to rotate to align the optical axis (axes) with an object of the viewer's attention at a distance. In binocular systems, the point at which the optical axes intersect can be called a "point of vergence." The amount of rotation of the viewer's eye(s) during vergence is interpreted by the viewer's brain as an estimated depth. Accommodation relates to the tendency of the lens(es) of the viewer's eye(s) to focus so that an object of the viewer's attention at a distance. The focus of the viewer's eye(s) during vergence is interpreted by the viewer's brain as another estimated depth. When the vergence and accommodation signals are interpreted by the viewer's brain as the same or similar estimated depths, the 3D viewing experience is natural and comfortable for the viewer. On the other hand, when the vergence and accommodation signals are interpreted by the viewer's brain as the substantially different estimated depths, the 3D viewing experience is suboptimal for the viewer, and may result in discomfort (eyestrain, headaches, etc.) and fatigue. Such problems are known as vergence-accommodation conflict.

Stereoscopic wearable glasses generally feature two displays for the left and right eyes that are configured to display images with slightly different element presentation such that a 3D perspective is perceived by the human visual system. Such configurations have been found to be uncomfortable for many users due to a mismatch between vergence and accommodation causing vergence-accommodation conflict which must be overcome to perceive the images in three dimensions. Indeed, some users are not able to tolerate stereoscopic configurations. These limitations apply to all typical XR systems. Accordingly, most conventional XR systems are not optimally suited for presenting a rich, binocular, 3D experiences in a manner that will be comfortable and maximally useful to the user, in part because prior systems fail to address some of the fundamental aspects of the human perception system, including the vergence-accommodation conflict.

XR systems must also be capable of displaying virtual digital content at various perceived positions and distances relative to the user for a 3D experience. The design of portable XR systems also presents numerous other challenges, including the speed of the system in delivering virtual digital content, quality of virtual digital content, eye relief of the user (addressing the vergence-accommodation conflict), size and portability of the system, battery life, system overheating, processing power, memory, bandwidth, and other system and optical challenges, which can negatively impact XR system performance. These limitations elevate the importance of 3D image rendering for natural vergence and accommodation.

Improved systems and techniques are needed for processing image data and displaying images, including, for example, systems and techniques for rendering and displaying 3D images to viewers/users while minimizing vergence-accommodation conflict, and systems and techniques for minimizing demands on limited graphical processing capabilities of portable XR systems while doing so. The systems and methods described herein are configured to address these challenges.

SUMMARY

Embodiments are directed to methods for controlling the performance of XR systems. In particular, the embodiments are directed to methods for modifying the content displayed by XR systems to reduce vergence-accommodation conflict experienced by users.

In one embodiment, a method for displaying virtual content using an expanded reality (XR) system includes an eye tracking subsystem of the XR system obtaining a render position error. The method also includes the XR system determining a range of operation from at least the render position error. The method further includes the XR system modifying the virtual content based on at least the range of operation before displaying the virtual content.

In another embodiment, a method for displaying virtual content using an expanded reality (XR) system includes the XR system obtaining a render position error. The method also includes the XR system determining a range of operation from at least the render position error. The method further includes the XR system modifying the virtual content based on at least the range of operation before displaying the virtual content.

In one or more embodiments, modifying the virtual content includes deleting a portion of the virtual content, and the portion corresponds to a depth outside of the range of operation from a focal plane of the XR system. Modifying the virtual content may include configuring a portion of the virtual content to be displayed monocularly, and the portion may correspond to a depth outside of the range of operation from a focal plane of the XR system.

In one or more embodiments, the render position error corresponds to a sighting center error. The method may include the XR system tracking a position of an eye of a user, and the XR system estimating a sighting center error from at least the position of the eye of the user. The method may include the XR system determining a system error corresponding to eye tracking by the XR system, and the XR system modifying the range of operation based on the system error. The method may include the XR system obtaining a characteristic of the eye of the user, and the XR system modifying the system error based at least on the characteristic of the eye of the user. The XR system may detect the characteristic of the eye of the user using a camera. The XR system may receive the characteristic of the eye of the user from the user through a user interface.

In one or more embodiments, the method includes the XR system updating the render position error in real-time. The method may include, when the XR system cannot update the render position error, the XR system reducing the range of operation to a predetermined minimum range of operation. The range of operation may be a binocular range of operation. The render position error may be a population level render position error.

In one or more embodiments, the method includes the XR system detecting a movement of the XR system, and the XR system estimating a sighting center error from at least the movement of the XR system. The movement of the XR system may be relative to a user. The XR system may detect the movement using an accelerometer. The method may include the XR system detecting a movement of the XR system, and the XR system the XR system reducing the range of operation to a predetermined minimum range of operation when the movement of the XR system is more than a predetermined threshold amount.

In still another embodiment, a method for displaying virtual content using an expanded reality (XR) system includes the XR system obtaining a time of continuous operation. The method also includes the XR system determining a range of operation from at least the time of continuous operation. The method further includes the XR system modifying the virtual content based on at least the range of operation before displaying the virtual content.

Some embodiments are directed to a system for displaying virtual contents using a wearable electronic device. In these embodiments, a wearable electronic device includes a or a pair of virtual-reality (VR), augmented-reality (AR), mixed-reality (MR), or extended-reality (XR) goggles, smart-glasses, or headset, a three-dimensional or stereoscopic wearable device, or a stereoscopic display device that in and of itself or when connected with another computing device (e.g., a smart phone, a tablet computing device, a laptop computer, a desktop computer, a gaming console, or a remote computer device such as a remote server, etc.) is capable of presenting virtual contents to a user.

The system comprises a display device that presents virtual contents to a user, a microprocessor operatively coupled to display device, and memory storing a sequence of instructions which, when executed by the microprocessor, causes the microprocessor to perform a set of acts. In these embodiments, the set of acts comprises determining, by a wearable electronic device, a sighting center for a first eye of the user wearing the wearable electronic device; and estimating, by the wearable electronic device or a remote computing device connected to the wearable electronic device via a network, an error or precision for the sighting center.

The set of acts further comprises determining a range of operation for a focal distance or a focal plane at the focal distance based at least in part upon the error or the precision and a criterion pertaining to vergence and accommodation of binocular vision of the virtual contents with the wearable electronic device; and adjusting a virtual content into an adjusted virtual content for presentation with respect to the focal plane or the focal distance based at least in part upon the range of operation.

In some of these embodiments, the set of acts further comprises identifying a characteristic of the first eye of the user, wherein the characteristic pertains to a disease of the eye of the user; and adjusting the sighting center based at least in part upon the characteristic of the first eye of the user.

In addition or in the alternative, the adjusted virtual content may be presented to the user at least by using the wearable electronic device that projects light beams pertaining to the adjusted virtual content with respect to the focal plane or the focal distance. Further, the aforementioned error or the precision comprises at least one of a render camera position error or precision that is specific to the user and the wearable electronic device, a system-level error or precision specific to the wearable electronic device, or a population-level residual error pertaining to a plurality of users.

In some embodiments, a determination may be made to decide whether a render position error or precision is to be updated based at least in part upon one or more criteria, and a first error or precision may be estimated for the sighting center.

In some of the immediately preceding embodiments, the range of operation may be adjusted into a smaller range of operation, wherein the smaller range of operation comprises a range of distances for the focal plane or the focal distance, and the virtual content with respect to the focal plane or the focal distance is rendered according to the smaller range of operation.

In addition or in the alternative, the system may be configured in such a way to receive a signal indicating a change in a relative position, movement, or motion between the wearable electronic device and the user and upon the receipt of the signal, determine a sighting center error or precision or a render camera position error or precision based at least upon the signal. The range of operation may be adjusted based at least in part upon the sighting center error or precision or the render camera position error or precision.

In some of the preceding embodiments, adjusting the range of operation may include making a determination of a render camera position for the first eye of the user at least by executing an eye tracking module of the wearable electronic device or by performing a visual task. Furthermore, an estimated sighting center error or precision may be determined for the render camera position for the first eye of the user, and the focal plane or the focal distance corresponding to a ground truth for a plurality of users may be identified.

In some of the immediately preceding embodiments, adjusting the range of operation may further include adjusting the range of operation for the focal plane or the focal distance into an adjusted range of operation based at least in part upon the estimated sighting center error or precision.

In some embodiments, determining the sighting center may present a first marker at a first location to the first eye of the user, wherein the first marker comprises a first hole in an object or a first rendered object and present a target to the first eye of the user at the focal plane or the focal distance.

In some of these embodiments, the target may be moved around the first marker. A first signal may be received from the user when the target becomes visible by the first eye of the user. Upon receiving the first signal, a first reference entity connecting the first marker and the target may be determined.

In some of the immediately preceding embodiments, a second marker may be presented at a second location to the first eye of the user, wherein the second marker comprises a second hole in the object or a second rendered object, and the target or a separate target may also be presented to the first eye of the user at the focal plane or the focal distance.

In some of the immediately preceding embodiments, the target or the separate target may be moved around the second marker. A second signal may be received from the user when the target or the separate target becomes visible by the first eye of the user. upon receiving the second signal, a second reference entity connecting the second marker and the target or the separate target may be determined. In addition or in the alternative, the sighting center may be determined for the first eye of the user based at least in part upon the first reference entity and the second reference entity.

In some embodiments where the system determines a sighting center, one or more light sources may emit light rays or beams towards an eye of a user. A first characteristic that is associated with an interaction of the eye of the user with the reflections of the light rays or beams may be detected using one or more sensors.

In some of these embodiments, the one or more sensors may include a photodiode, and the one or more light sources may include a light emitting diode. In some embodiments, the first characteristic may include a return, a reflection, or a specific pattern in response to at least some of the first light rays or beams from the eye of the user and detected by the one or more sensors. In addition, a first reference entity that comprises, for example, a first gaze direction may be determined based at least in part upon the first characteristic.

In some of these embodiments, the one or more light sources may emit second light rays or beams towards the same eye of the user. A second characteristic that is associated with an interaction of the eye of the user with the second light rays or beams may be detected using one or more camera sensors that are instrumented for the eye of the user.

In some of these embodiments, the one or more sensors may include a photodiode, and the one or more light sources may include a light emitting diode. In some embodiments, the second characteristic may include a return, a reflection, or a specific pattern in response to at least some of the second light rays or beams from the eye of the user and detected by the one or more sensors. In addition, a second reference entity that comprises, for example, a second gaze direction may be determined based at least in part upon the first characteristic.

The sighting center of the eye of the user may be determined based at least in part upon the first reference entity and the second reference entity. For example, the sighting center of the eye of the user may be determined to be the intersection of the first reference entity and the second reference entity.

Some of these embodiments assume both eyes of the user move in tandem and thus instrument only one eye, but not both eyes, of the user with the aforementioned one or more light sources and one or more sensors. Some other embodiments instrument both eyes of the user with the aforementioned one or more light sources and one or more sensors for each of the two eyes of the user. In these latter embodiments, the respective sighting center of each of the two eyes of a user may be independently determined. In some of these embodiments, the respective sighting centers together with the respective gaze directions may be used to characterize focal depths, focal planes, vergence, accommodation, ranges of operations pertaining to a focal plane or focal depth, etc.

Some embodiments are directed to a method for displaying virtual contents using a wearable electronic device. In these embodiments, a wearable electronic device includes a or a pair of virtual-reality (VR), augmented-reality (AR), mixed-reality (MR), or extended-reality (XR) goggles, smart-glasses, or headset, a three-dimensional or stereoscopic wearable device, or a stereoscopic display device that in and of itself or when connected with another computing device (e.g., a smart phone, a tablet computing device, a laptop computer, a desktop computer, a gaming console, or a remote computer device such as a remote server, etc.) is capable of presenting virtual contents to a user.

In these embodiments, a wearable electronic device may determine a sighting center for a first eye of the user wearing the wearable electronic device, and the wearable electronic device or a remote computing device connected to the wearable electronic device via a network may further estimate an error or precision for the sighting center. A range of operation may be determined for a focal distance or a focal plane at the focal distance based at least in part upon the error or the precision and a criterion pertaining to vergence and accommodation of binocular vision of the virtual contents with the wearable electronic device. A virtual content may be adjusted into an adjusted virtual content for presentation with respect to the focal plane or the focal distance based at least in part upon the range of operation.

In some of these embodiments, a characteristic of the first eye of the user may be identified, wherein the characteristic pertains to a disease of the eye of the user; and adjusting the sighting center based at least in part upon the characteristic of the first eye of the user.

In addition or in the alternative, the adjusted virtual content may be presented to the user at least by using the wearable electronic device that projects light beams pertaining to the adjusted virtual content with respect to the focal plane or the focal distance. Further, the aforementioned error or the precision comprises at least one of a render camera position error or precision that is specific to the user and the wearable electronic device, a system-level error or precision specific to the wearable electronic device, or a population-level residual error pertaining to a plurality of users.

In some embodiments, a determination may be made to decide whether a render position error or precision is to be updated based at least in part upon one or more criteria, and a first error or precision may be estimated for the sighting center.

In some of the immediately preceding embodiments, the range of operation may be adjusted into a smaller range of operation, wherein the smaller range of operation comprises a range of distances for the focal plane or the focal distance, and the virtual content with respect to the focal plane or the focal distance is rendered according to the smaller range of operation.

In addition or in the alternative, the system may be configured in such a way to receive a signal indicating a change in a relative position, movement, or motion between the wearable electronic device and the user and upon the receipt of the signal, determine a sighting center error or precision or a render camera position error or precision based at least upon the signal. The range of operation may be adjusted based at least in part upon the sighting center error or precision or the render camera position error or precision.

In some of the preceding embodiments, adjusting the range of operation may include making a determination of a render camera position for the first eye of the user at least by executing an eye tracking module of the wearable electronic device or by performing a visual task. Furthermore, an estimated sighting center error or precision may be determined for the render camera position for the first eye of the user, and the focal plane or the focal distance corresponding to a ground truth for a plurality of users may be identified.

In some of the immediately preceding embodiments, adjusting the range of operation may further include adjusting the range of operation for the focal plane or the focal distance into an adjusted range of operation based at least in part upon the estimated sighting center error or precision.

In some embodiments, determining the sighting center may present a first marker at a first location to the first eye of the user, wherein the first marker comprises a first hole in an object or a first rendered object and present a target to the first eye of the user at the focal plane or the focal distance.

In some of these embodiments, the target may be moved around the first marker. A first signal may be received from the user when the target becomes visible by the first eye of the user. Upon receiving the first signal, a first reference entity connecting the first marker and the target may be determined.

In some of the immediately preceding embodiments, a second marker may be presented at a second location to the first eye of the user, wherein the second marker comprises a second hole in the object or a second rendered object, and the target or a separate target may also be presented to the first eye of the user at the focal plane or the focal distance.

In some of the immediately preceding embodiments, the target or the separate target may be moved around the second marker. A second signal may be received from the user when the target or the separate target becomes visible by the first eye of the user. upon receiving the second signal, a second reference entity connecting the second marker and the target or the separate target may be determined. In addition or in the alternative, the sighting center may be determined for the first eye of the user based at least in part upon the first reference entity and the second reference entity.

In some embodiments where the system determines a sighting center may, one or more light sources may emit first light rays or beams towards an eye of a user. A first characteristic that is associated with an interaction of the eye of the user with the first light rays or beams may be detected using one or more sensors.

In some of these embodiments, the one or more sensors may include a photodiode, and the one or more light sources may include a light emitting diode. In some embodiments, the first characteristic may include a return, a reflection, or a specific pattern in response to at least some of the first light rays or beams from the eye of the user and detected by the one or more sensors. In addition, a first reference entity that comprises, for example, a first gaze direction may be determined based at least in part upon the first characteristic.

In some of these embodiments, the one or more light sources may emit second light rays or beams towards the same eye of the user. A second characteristic that is associated with an interaction of the eye of the user with the second light rays or beams may be detected using one or more sensors that are instrumented for the eye of the user.

In some of these embodiments, the one or more sensors may include a photodiode, and the one or more light sources may include a light emitting diode. In some embodiments, the second characteristic may include a return, a reflection, or a specific pattern in response to at least some of the second light rays or beams from the eye of the user and detected by the one or more sensors. In addition, a second reference entity that comprises, for example, a second gaze direction may be determined based at least in part upon the first characteristic.

The sighting center of the eye of the user may be determined based at least in part upon the first reference entity and the second reference entity. For example, the sighting center of the eye of the user may be determined to be the intersection of the first reference entity and the second reference entity.

Some of these embodiments assume both eyes of the user move in tandem and thus instrument only one eye, but not both eyes, of the user with the aforementioned one or more light sources and one or more sensors. Some other embodiments instrument both eyes of the user with the aforementioned one or more light sources and one or more sensors for each of the two eyes of the user. In these latter embodiments, the respective sighting center of each of the two eyes of a user may be independently determined. In some of these embodiments, the respective sighting centers together with the respective gaze directions may be used to characterize focal depths, focal planes, vergence, accommodation, ranges of operations pertaining to a focal plane or focal depth, etc.

Some embodiments are directed to a computer program product comprising a non-transitory machine readable storage medium having stored thereupon a sequence of instructions which, when executed by a microprocessor, causes the microprocessor to perform a set of acts for displaying virtual contents using a wearable electronic device. In these embodiments, a wearable electronic device includes a or a pair of virtual-reality (VR), augmented-reality (AR), mixed-reality (MR), or extended-reality (XR) goggles, smart-glasses, or headset, a three-dimensional or stereoscopic wearable device, or a stereoscopic display device that in and of itself or when connected with another computing device (e.g., a smart phone, a tablet computing device, a laptop computer, a desktop computer, a gaming console, or a remote computer device such as a remote server, etc.) is capable of presenting virtual contents to a user.

In these embodiments, the set of acts comprises determining, by a wearable electronic device, a sighting center for a first eye of the user wearing the wearable electronic device; and estimating, by the wearable electronic device or a remote computing device connected to the wearable electronic device via a network, an error or precision for the sighting center.

The set of acts further comprises determining a range of operation for a focal distance or a focal plane at the focal distance based at least in part upon the error or the precision and a criterion pertaining to vergence and accommodation of binocular vision of the virtual contents with the wearable electronic device; and adjusting a virtual content into an adjusted virtual content for presentation with respect to the focal plane or the focal distance based at least in part upon the range of operation.

In some of these embodiments, the set of acts further comprises identifying a characteristic of the first eye of the user, wherein the characteristic pertains to a disease of the eye of the user; and adjusting the sighting center based at least in part upon the characteristic of the first eye of the user.

In addition or in the alternative, the adjusted virtual content may be presented to the user at least by using the wearable electronic device that projects light beams pertaining to the adjusted virtual content with respect to the focal plane or the focal distance. Further, the aforementioned error or the precision comprises at least one of a render camera position error or precision that is specific to the user and the wearable electronic device, a system-level error or precision specific to the wearable electronic device, or a population-level residual error pertaining to a plurality of users.

In some embodiments, a determination may be made to decide whether a render position error or precision is to be updated based at least in part upon one or more criteria, and a first error or precision may be estimated for the sighting center.

In some of the immediately preceding embodiments, the range of operation may be adjusted into a smaller range of operation, wherein the smaller range of operation comprises a range of distances for the focal plane or the focal distance, and the virtual content with respect to the focal plane or the focal distance is rendered according to the smaller range of operation.

In addition or in the alternative, the system may be configured in such a way to receive a signal indicating a change in a relative position, movement, or motion between the wearable electronic device and the user and upon the receipt of the signal, determine a sighting center error or precision or a render camera position error or precision based at least upon the signal. The range of operation may be adjusted based at least in part upon the sighting center error or precision or the render camera position error or precision.

In some of the preceding embodiments, adjusting the range of operation may include making a determination of a render camera position for the first eye of the user at least by executing an eye tracking module of the wearable electronic device or by performing a visual task. Furthermore, an estimated sighting center error or precision may be determined for the render camera position for the first eye of the user, and the focal plane or the focal distance corresponding to a ground truth for a plurality of users may be identified.

In some of the immediately preceding embodiments, adjusting the range of operation may further include adjusting the range of operation for the focal plane or the focal distance into an adjusted range of operation based at least in part upon the estimated sighting center error or precision.

In some embodiments, determining the sighting center may present a first marker at a first location to the first eye of the user, wherein the first marker comprises a first hole in an object or a first rendered object and present a target to the first eye of the user at the focal plane or the focal distance.

In some of these embodiments, the target may be moved around the first marker. A first signal may be received from the user when the target becomes visible by the first eye of the user. Upon receiving the first signal, a first reference entity connecting the first marker and the target may be determined.

In some of the immediately preceding embodiments, a second marker may be presented at a second location to the first eye of the user, wherein the second marker comprises a second hole in the object or a second rendered object, and the target or a separate target may also be presented to the first eye of the user at the focal plane or the focal distance.

In some of the immediately preceding embodiments, the target or the separate target may be moved around the second marker. A second signal may be received from the user when the target or the separate target becomes visible by the first eye of the user. upon receiving the second signal, a second reference entity connecting the second marker and the target or the separate target may be determined. In addition or in the alternative, the sighting center may be determined for the first eye of the user based at least in part upon the first reference entity and the second reference entity.

In some embodiments where the system determines a sighting center may, one or more light sources may emit first light rays or beams towards an eye of a user. A first characteristic that is associated with an interaction of the eye of the user with the first light rays or beams may be detected using one or more sensors.

In some of these embodiments, the one or more sensors may include a photodiode, and the one or more light sources may include a light emitting diode. In some embodiments, the first characteristic may include a return, a reflection, or a specific pattern in response to at least some of the first light rays or beams from the eye of the user and detected by the one or more sensors. In addition, a first reference entity that comprises, for example, a first gaze direction may be determined based at least in part upon the first characteristic.

In some of these embodiments, the one or more light sources may emit second light rays or beams towards the same eye of the user. A second characteristic that is associated with an interaction of the eye of the user with the second light rays or beams may be detected using one or more sensors that are instrumented for the eye of the user.

In some of these embodiments, the one or more sensors may include a photodiode, and the one or more light sources may include a light emitting diode. In some embodiments, the second characteristic may include a return, a reflection, or a specific pattern in response to at least some of the second light rays or beams from the eye of the user and detected by the one or more sensors. In addition, a second reference entity that comprises, for example, a second gaze direction may be determined based at least in part upon the first characteristic.

The sighting center of the eye of the user may be determined based at least in part upon the first reference entity and the second reference entity. For example, the sighting center of the eye of the user may be determined to be the intersection of the first reference entity and the second reference entity.

Some of these embodiments assume both eyes of the user move in tandem and thus instrument only one eye, but not both eyes, of the user with the aforementioned one or more light sources and one or more sensors. Some other embodiments instrument both eyes of the user with the aforementioned one or more light sources and one or more sensors for each of the two eyes of the user. In these latter embodiments, the respective sighting center of each of the two eyes of a user may be independently determined. In some of these embodiments, the respective sighting centers together with the respective gaze directions may be used to characterize focal depths, focal planes, vergence, accommodation, ranges of operations pertaining to a focal plane or focal depth, etc.

Additional and other objects, features, and advantages of the disclosure are described in the detail description, figures. and claims.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
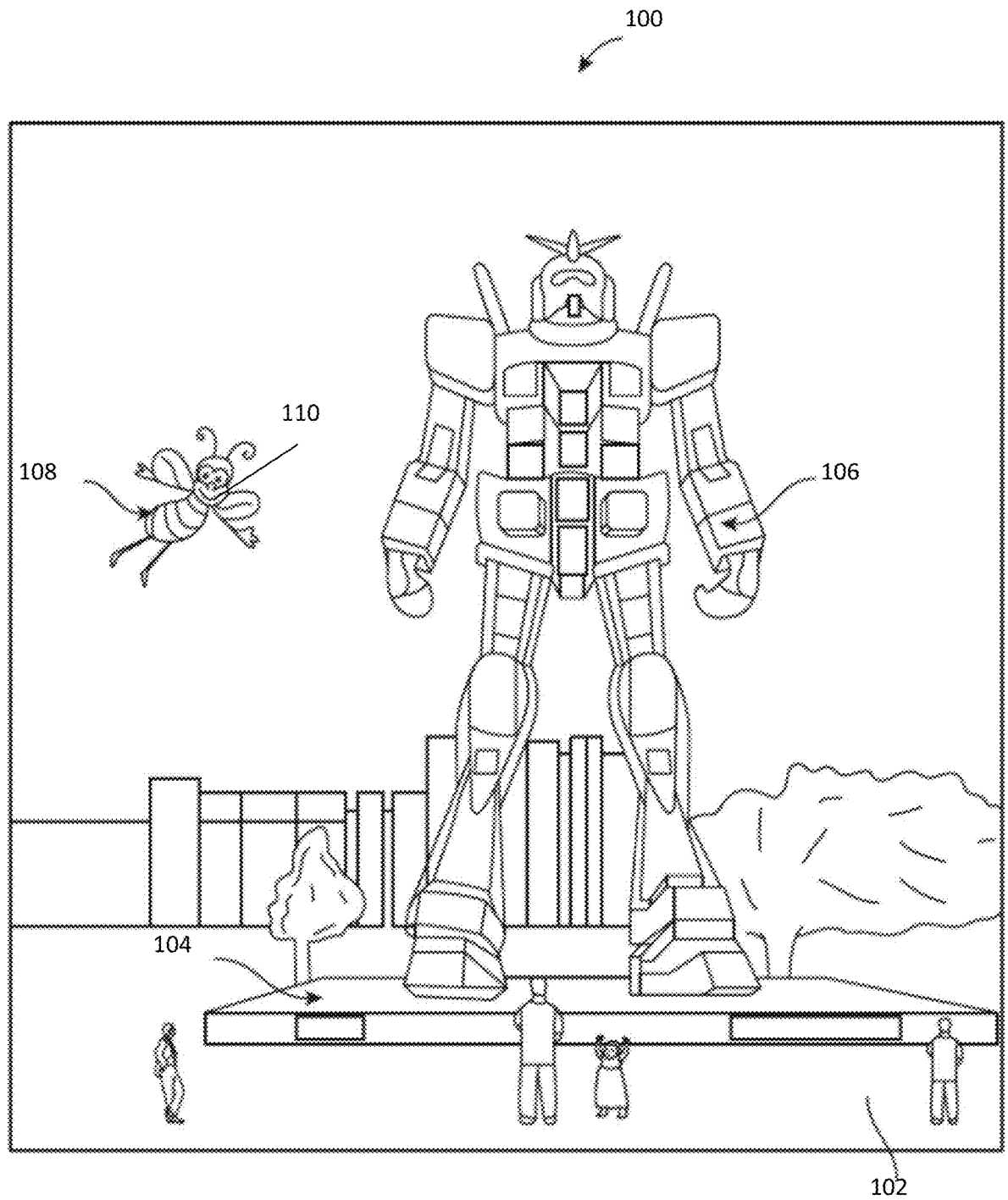
FIG. 1 depicts a user's view of AR/MR through a wearable AR/MR user device, according to some embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Various embodiments of the disclosure are directed to systems, methods, and articles of manufacture for controlling the performance of XR systems in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The performance control systems may be implemented independently of XR systems, but some embodiments below are described in relation to AR systems for illustrative purposes only. For instance, the performance control systems described herein may also be used in an identical manner with VR (virtual reality), MR (mixed-reality), and XR (extended reality) systems. In various embodiments described herein, the terms augmented reality (AR), virtual reality (VR), mixed-reality (MR), and extended reality (XR) may be used interchangeably, unless otherwise explicitly distinguished or stated to the contrary.

Illustrative AR Scenario and System

The description that follows pertains to an illustrative AR system the performance of which may be controlled/modified. However, it is to be understood that the embodiments also lend themselves to applications in other types of display systems (including other types of XR systems such as VR and MR systems), and therefore the embodiments are not to be limited to only the illustrative system disclosed herein.

AR scenarios often include presentation of virtual content (e.g., color images and sound) corresponding to virtual objects in relationship to real-world objects. For example, referring to FIG. 1, an AR scene 100 is depicted wherein a user of an AR technology sees a real-world, physical, park-like setting 102 featuring people, trees, buildings in the background, and a real-world, physical concrete platform 104. In addition to these items, the user of the AR technology also perceives that they "see" a virtual robot statue 106 standing upon the physical concrete platform 104, and a virtual cartoon-like avatar character 108 flying by which seems to be a personification of a bumblebee, even though these virtual objects 106, 108 do not exist in the real-world.

Figure 2:
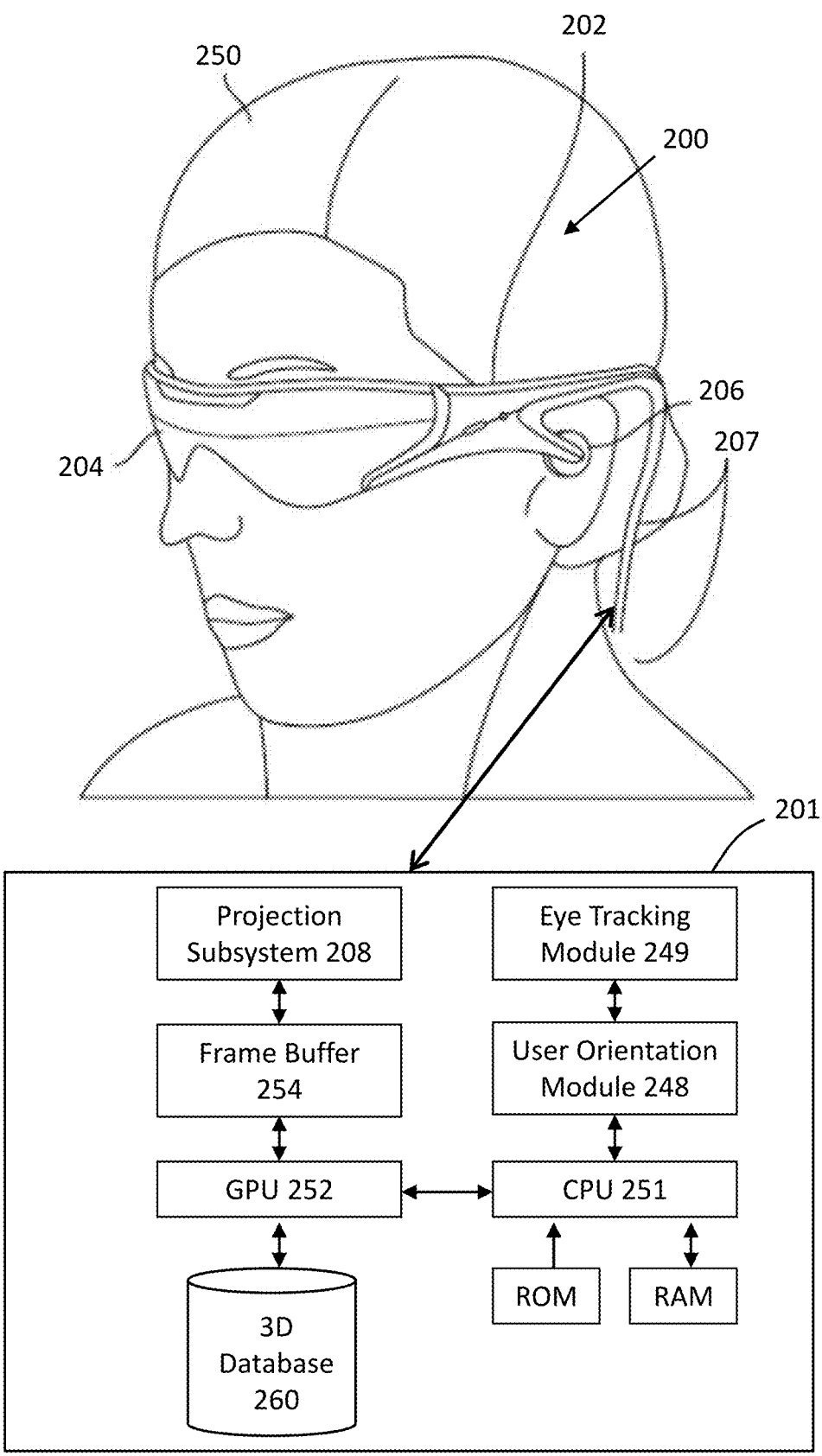
FIG. 2 schematically depicts XR systems and subsystems thereof, according to some embodiments.

Referring to FIG. 2, one embodiment of an AR system 200, 7 according to some embodiments. The AR system 200 may be operated in conjunction with a projection subsystem 208, providing images of virtual objects intermixed with physical objects in a field of view of a user 250. This approach employs one or more at least partially transparent surfaces through which an ambient real-world environment including the physical objects can be seen and through which the AR system 200 produces images of the virtual objects. The projection subsystem 208 is housed in a control subsystem 201 operatively coupled to a display system/subsystem 204 through a link 207. The link 207 may be a wired or wireless communication link.

For AR applications, it may be desirable to spatially position various virtual objects relative to respective physical objects in a field of view of the user 250. The virtual objects may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The AR system 200 comprises a frame structure 202 worn by the user 250, the display system 204 carried by the frame structure 202, such that the display system 204 is positioned in front of the eyes of the user 250, and a speaker 206 incorporated into or connected to the display system 204. In the illustrated embodiment, the speaker 206 is carried by the frame structure 202, such that the speaker 206 is positioned adjacent (in or around) the ear canal of the user 250, e.g., an earbud or headphone.

The display system 204 is designed to present the eyes of the user 250 with photo-based radiation patterns that can be comfortably perceived as augmentations to the ambient environment including both two-dimensional and 3D content. The display system 204 presents a sequence of frames at high frequency that provides the perception of a single coherent scene. To this end, the display system 204 includes the projection subsystem 208 and a partially transparent display screen through which the projection subsystem 208 projects images. The display screen is positioned in a field of view of the user 250 between the eyes of the user 250 and the ambient environment.

In some embodiments, the projection subsystem 208 takes the form of a scan-based projection device and the display screen takes the form of a waveguide-based display into which the scanned light from the projection subsystem 208 is injected to produce, for example, images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (e.g., one layer is within the circle of confusion or the cone of confusion of an adjacent layer). A circle of confusion is, in optics, an optical spot that is caused by a cone of light of light rays from a lens that is not coming to a perfect focus when imaging a point source in some embodiments and may thus be also referred to as a cone of confusion, a disk of confusion, a circle of indistinctness, a blur circle, or a blur spot in some embodiments of the present application. A cone of confusion in these embodiments is thus distinguishable from a cone of confusion in the context of navigation or the context pertaining an organism's ears. Additionally or alternatively, picture elements may be blended across two or more layers to increase perceived continuity of transition between layers in the light field, even if those layers are more sparsely stacked (e.g., one layer is outside the cone of confusion of an adjacent layer). The display system 204 may be monocular or binocular. The scanning assembly includes one or more light sources that produce the light beam (e.g., emits light of different colors in defined patterns). The light source may take any of a large variety of forms, for instance, a set of red, green, and blue (RGB) sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. The optical coupling subsystem includes an optical waveguide input apparatus, such as for instance, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem includes an optical modulation apparatus configured for converging the light from the collimation element towards a focal point in the center of the optical waveguide input apparatus, thereby allowing the size of the optical waveguide input apparatus to be minimized. Thus, the display subsystem 204 generates a series of synthetic image frames of pixel information that present an undistorted image of one or more virtual objects to the user. The display subsystem 204 may also generate a series of color synthetic sub-image frames of pixel information that present an undistorted color image of one or more virtual objects to the user. Further details describing display subsystems are provided in U.S. patent application Ser. Nos. 14/212,961 and 14/331,218, the contents of which have been previously incorporated by reference herein.

The AR system 200 further includes one or more sensors mounted to the frame structure 202 for detecting the position (including orientation) and movement of the head of the user 250 and/or the eye position and inter-ocular distance of the user 250. Such sensor(s) may include image capture devices, microphones, inertial measurement units (IMUs), accelerometers, compasses, GPS units, radio devices, gyros and the like. For example, in one embodiment, the AR system 200 includes a head worn transducer subsystem that includes one or more inertial transducers to capture inertial measures indicative of movement of the head of the user 250. Such devices may be used to sense, measure, or collect information about the head movements of the user 250. For instance, these devices may be used to detect/measure movements, speeds, acceleration and/or positions of the head of the user 250. The position (including orientation) of the head of the user 250 is also known as a "head pose" of the user 250.

The AR system 200 of FIG. 2 may include one or more forward facing cameras. The cameras may be employed for any number of purposes, such as recording of images/video from the forward direction of the system 200. In addition, the cameras may be used to capture information about the environment in which the user 250 is located, such as information indicative of distance, orientation, and/or angular position of the user 250 with respect to that environment and specific objects in that environment.

The AR system 200 may further include rearward facing cameras to track angular position (the direction in which the eye or eyes are pointing), blinking, and depth of focus (by detecting eye convergence) of the eyes of the user 250. Such eye tracking information may, for example, be discerned by projecting light at the end user's eyes, and detecting the return or reflection of at least some of that projected light.

The augmented reality system 200 further includes a control subsystem 201 that may take any of a large variety of forms. The control subsystem 201 includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUS). The control subsystem 201 may include a digital signal processor (DSP), a central processing unit (CPU) 251, a graphics processing unit (GPU) 252, and one or more frame buffers 254. The CPU 251 controls overall operation of the system, while the GPU 252 renders frames (i.e., translating a 3D scene into a two-dimensional image) and stores these frames in the frame buffer(s) 254. While not illustrated, one or more additional integrated circuits may control the reading into and/or reading out of frames from the frame buffer(s) 254 and operation of the display system 204. Reading into and/or out of the frame buffer(s) 254 may employ dynamic addressing, for instance, where frames are over-rendered. The control subsystem 201 further includes a read only memory (ROM) and a random-access memory (RAM). The control subsystem 201 further includes a 3D database 260 from which the GPU 252 can access 3D data of one or more scenes for rendering frames, as well as synthetic sound data associated with virtual sound sources contained within the 3D scenes.

The augmented reality system 200 further includes a user orientation detection module 248. The user orientation module 248 detects the instantaneous position of the head of the user 250 and may predict the position of the head of the user 250 based on position data received from the sensor(s). The augmented reality system 200 further includes an eye tracking module 249. The eye tracking module 249 tracks the eyes of the user 250, and in particular the direction and/or distance at which the user 250 is focused based on the tracking data received from the sensor(s).

Render Position Error Causes User Discomfort

Errors in placing the render camera for rendering virtual content can lead to severe visual discomfort. Similar to vergence and accommodation conflict, the discomfort is more likely to occur as the virtual content is rendered farther away from the focal plane.

Stereoscopic 3D displays may render virtual content that appears in front of or behind the image plane by applying binocular parallax to the images displayed to the left and right eyes. However, after prolonged viewing of such stereoscopic 3D displays, many users experience visual discomfort such as eye strain, headaches, and nausea. As content is displayed farther from the physical image plane/focal plane, the more likely these symptoms of visual discomfort are to arise.

Vergence and accommodation conflict that occurs in stereoscopic 3D displays are related to visual discomfort associated there with. Vergence eye movements ensure that lines of sight of both of a user's eyes are directed at objects of interest. This causes the eyes to cross when looking at nearby objects, and to be parallel when objects are viewed at infinity. Near and far objects also require the eyes to individually adjust the power of their lenses to maintain a sharp image (a process known as accommodation). In real world viewing, vergence and accommodation go hand in hand; near vergence correlates with strong accommodation, and far vergence correlates with focus at infinity. However, in stereoscopic 3D displays, this coupling is broken because the image is always sharpest when the eye remains focused on the depth of the physical display, regardless of vergence and the apparent depth of the content.

With larger vergence accommodation conflict, geometric distortions are also more likely to occur. This happens when the left and right eyes' images are rendered from render camera positions (i.e., viewing positions for which the images are configured/rendered) that do not align properly with the respective sighting centers (e.g., a sighting center of an eye may include the center of the eye or a portion thereof such as the cornea, iris, lens, retina, etc. of the eye as represented in a two-dimensional or three-dimensional model for the eye in some embodiments) of the user's eyes. The distortion of the geometry of the rendered scene can force each eye, in their attempt to stay directed at the content of interest, to make unnatural eye movements. For instance, when the render cameras positions are offset vertically, the eyes make vertical movements in opposite directions. Such vertical vergence movements are unnatural because they never occur in real world viewing. Inducing vertical separations of the two lines of the sights as small as 8-10 minutes of arc can cause discomfort within seconds of viewing. Depending on the geometric distortions that are introduced, different symptoms may be experienced and can be as severe as motion sickness.

Figure 3A:
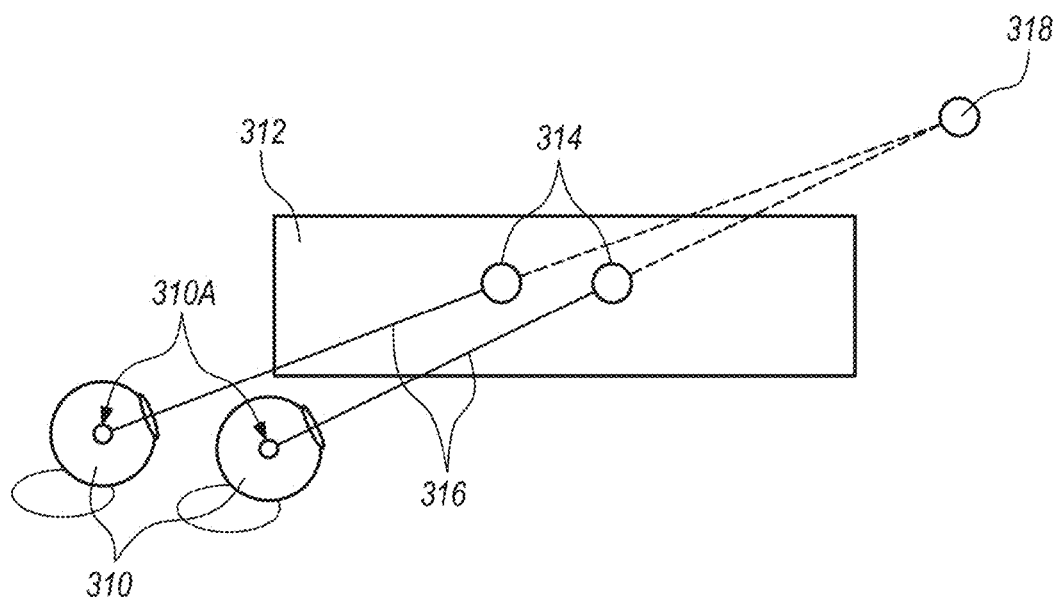
FIGS. 3A and 3B schematically depict the eyes of a user viewing a display, according to some embodiments.

FIG. 3A schematically depicts the eyes 310 of the user viewing a display 312 when the render cameras 310A are in the same position as the sighting centers of the eyes 310. As a result, the images 314 on the display 312 are aligned with the sightlines 316 of the eyes 310. Content 318 can be rendered with binocular parallax (i.e., closer or farther than the display 312) so that it appears to the eyes 310 in a way that is similar to real world objects.

Figure 3B:
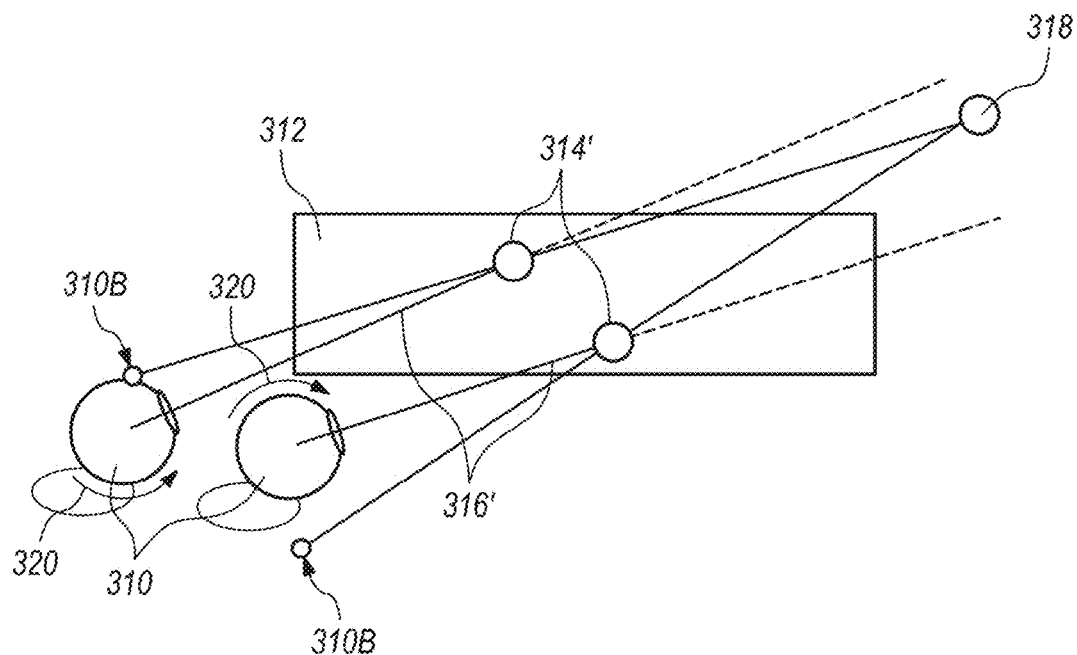

FIG. 3B schematically depicts the eyes 310 of the user viewing a display 312 when the render cameras 310B are in the positions misaligned from the sighting centers of the eyes 310. As a result, the images 314' on the display 312 are misaligned with the natural sightlines 316 of the eyes 310 (see FIG. 3A). When the render cameras 310B are misaligned relative to the sighting center of the eyes 310, the eyes can be forced to rotate 322 reposition the sightlines 316' in ways that never occur when viewing the real world, thereby causing discomfort.

Range of Operation for XR Systems

An important operating parameter of 3D display systems (e.g., XR systems) is how far away from the focal plane can content be presented and still be viewed comfortably. This operating parameter, which can be called a "range of operation" of the display system, is related to the amount of binocular parallax that is tolerable to a user. Accurately determining/estimating the range of operation facilitates design of XR systems, applications, and content that are comfortable to use and consume.

A comfortable range of operation for XR systems may be determined based at least partially on the precision/error of the estimate of the sighting centers of the eyes/render camera positions. In some embodiments, the determined range of operation is used to limit the range of stereoscopic depth for example using clip planes in front and behind the focal plane (implemented in software). In other embodiments, the determined range of operation is used to provide guidelines to content creators as to where to comfortably position 3D objects in virtual images.

Figure 4:
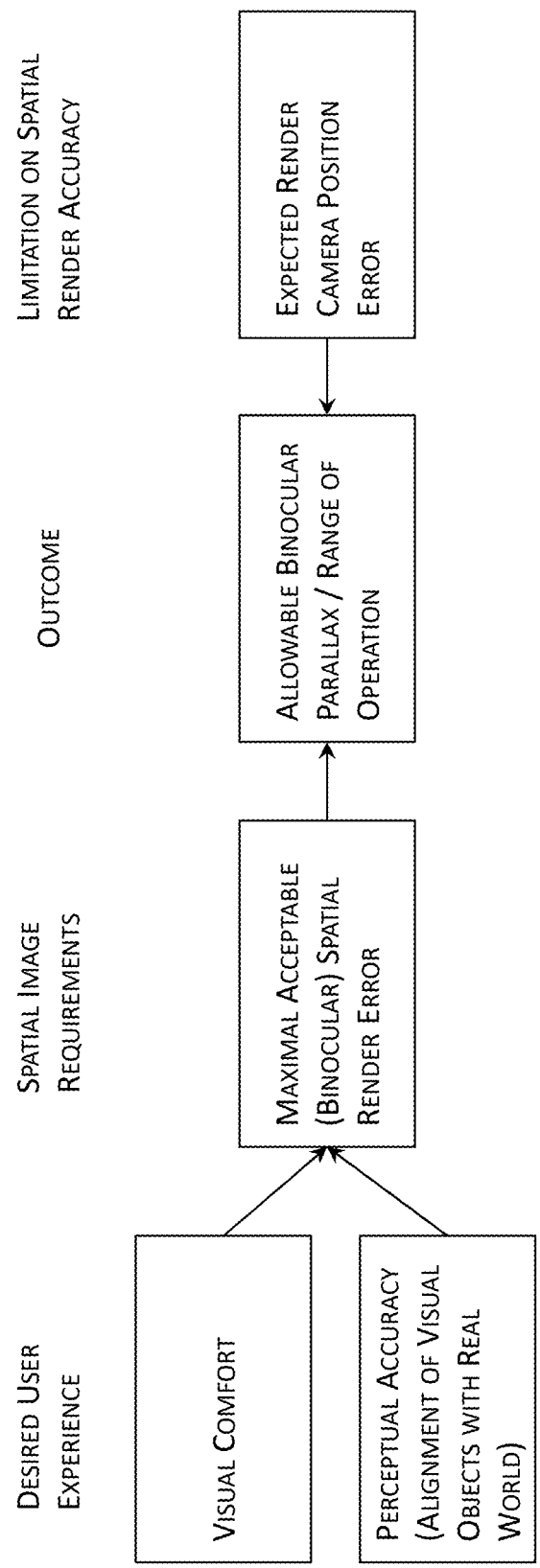
FIG. 4 schematically depicts the inputs to determining a range of operation for an XR system, according to some embodiments.

FIG. 4 schematically depicts the inputs to determining a range of operation for an XR system. Visual comfort and perceptual accuracy are inputs relating to the desired user experience. These inputs determined the maximum acceptable spatial render error. The expected sighting center/render camera position error is a limitation on spatial rendering accuracy. The expected sighting center/render camera position error and the maximal acceptable spatial render error together determine the range of operation (and focal plane location). Assuming that the maximal acceptable spatial render error of a system/user is known, by determining or estimating the error in the sighting center/render camera position, the range of operation can be calculated.

Errors in the location of the content in the display (i.e., spatial render errors; compare FIGS. 3A and 3B) are related to the position of the render camera relative to the sighting center of the human eye or the pupil center. The render camera position for a user of 3D (three-dimensional) wearable and other stereoscopic displays can be determined/estimated using eye tracking technology and/or methods that require users to perform a visual task. However, even when these methods are used, a residual error in render camera position remains for most users. This residual error can be known at a population level, using the error distribution of a representative group of users collected in a ground truth test setup. With this known population level render camera position error, the comfortable range of operation given a focal plane location can be calculated. In various embodiments, VR/AR/MR/XR smart-glasses, goggles, or headsets, 3D wearable or stereoscopic devices, stereoscopic displays, or any electronic devices that presents virtual contents to users may be collectively referred to as a wearable electronic device or a wearable electronic stereoscopic display device.

Most commercially available 3D display headsets do not use eye tracking or a visual task to determine the sighting center/render camera position. In some cases, the headsets do not even allow the user to set their inter-pupillary distance (IPD), which can provide a very coarse estimate of the sighting center/render camera position. Even in these cases position errors may still result from determining a very coarse sighting center/render camera position using population IPD data.

Figure 5:
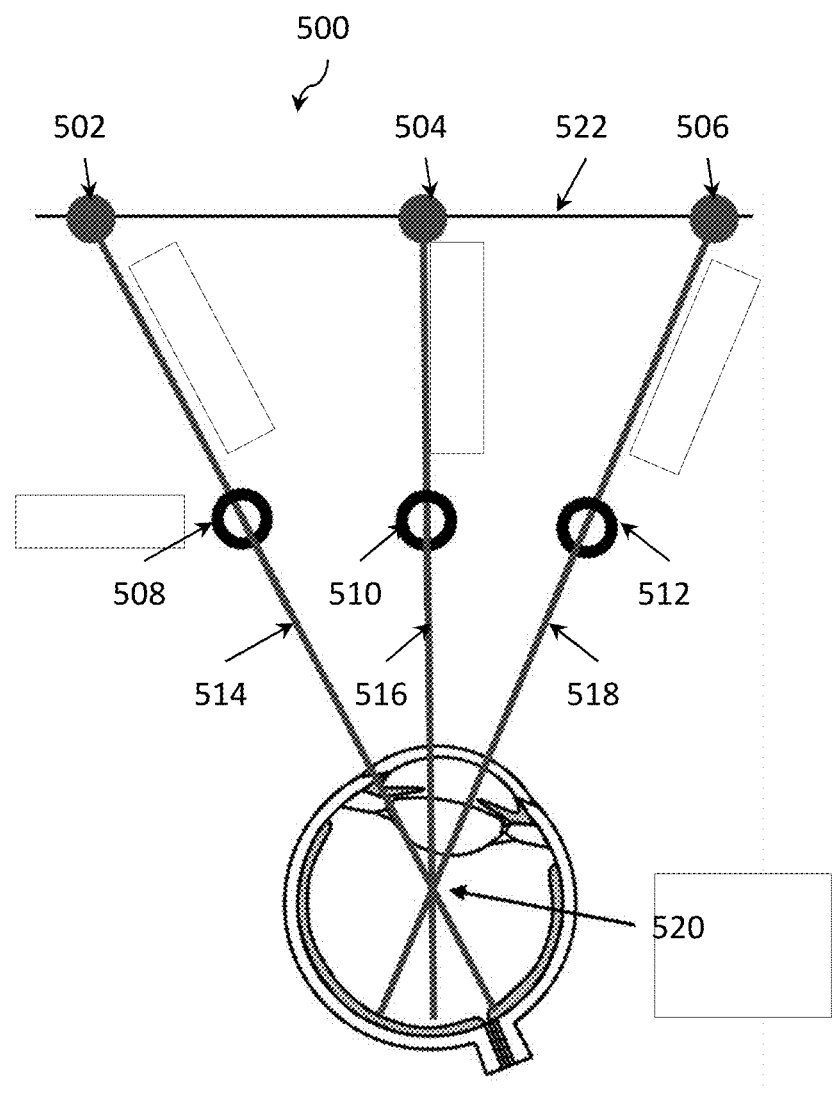
FIG. 5 schematically depicts determining/estimating a sighting center/render camera position using a user input, according to some embodiments.

FIG. 5 schematically depicts determining/estimating a sighting center/render camera position using a user input (e.g., via a user interface). The sighting center of an eye can be found using a task where target dots (e.g., 502, 504, and/or 506) on a display are moved until they visually align with an array of holes (e.g., 508, 510, and/or 512) in front of the display 522. The observer looks with one eye through each of the holes (e.g., 508, 510, and/or 512) sequentially, and moves the dots (e.g., 502, 504, and/or 506) on the display 512 until they are visible through the holes (e.g., 508, 510, and/or 512). The sighting center 520 is where all the lines (e.g., 514, 516, and/or 518) that connect the holes (e.g., 508, 510, and/or 512) and their corresponding dots (e.g., 502, 504, and/or 506) intersect.

Vertical Misalignment and Range of Operation for XR Systems

Figure 6A:
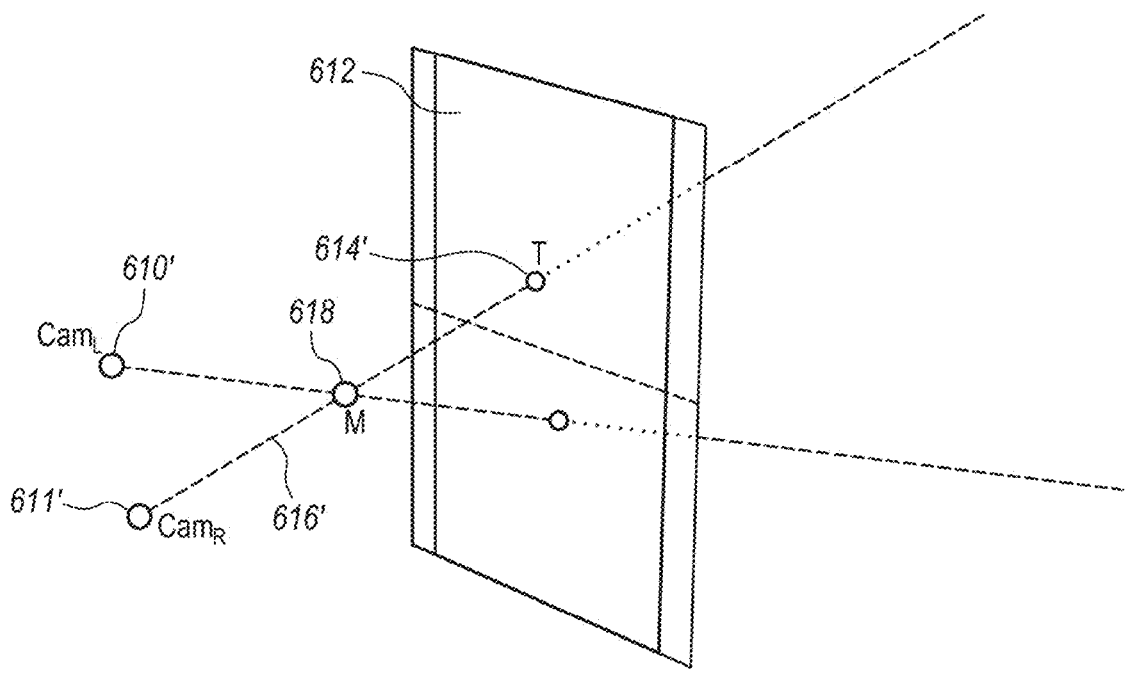
FIGS. 6A and 6B schematically depict the eyes of a user viewing a display, according to some embodiments.
Figure 6B:
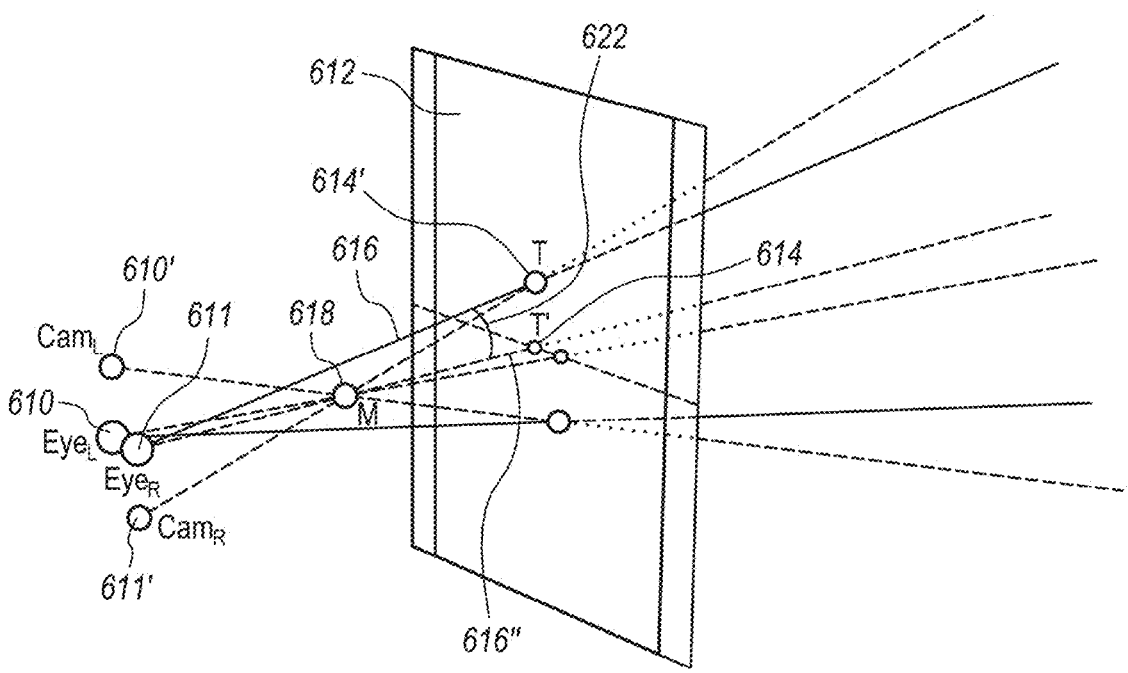

Vertical binocular misalignment is expressed in binocular vertical parallax in arcmin. FIGS. 6A and 6B schematically depict the eyes of a user viewing a display without (FIG. 6A) and with (FIG. 6B) vertical binocular misalignment. The vertical binocular misalignment becomes noticeable at around 8-10 arcmin (see FIGS. 3A and 3B). A comfortable range of operation can be calculated using this number (i.e., 8-10 arcmin) and a known precision of the sighting center/render camera position estimate.

For example, when the precision of the sighting center/render camera position estimate is 1 mm (i.e., for 95% of the users the error is 0.5 mm or smaller) and a worse-case scenario is where the sighting centers are misestimated with one render camera position 1 mm higher than the sighting center and the render camera for the other eye 1 mm lower than the sighting center, the maximum range of operation for an XR system with a focal plane at 74 cm (1.35 dpt) is +1.35 diopter to −1.35 diopter, corresponding to a range of operation from 37 cm to infinity. The relationship between the range of operation, the focal plane, and the precision of the sighting center estimate can be generically described as follows. A higher precision in terms of mm, means lower errors, and results in a larger range of operation in terms of diopters. Changing the position of the focal plane alters the range of operation measured in distance nonlinearly because the focal plane measured in diopters changes nonlinearly with distance from the eye.

FIG. 6A shows two render cameras, one for the left eye (Cam_L) 610' and one for the right eye (Cam_R) 611', drawing images of a target object (M) 618 on a display 612. For the sake of simplicity, the geometry is described only for the right eye 611'. The stereoscopic display 612' is at a particular distance from the render camera 611'. The position of the target object M 618 on the display 612 is determined by projecting a ray 616' from the camera 616' through the target object M 618 to the display 612. Where the display 612 and the ray 618 intersect, target image T 614' is drawn on the display 612 based on the right eye render camera 611'.

FIG. 6B shows the eyes 610, 611 of a user looking at the same target object M 618 as drawn on the display 612 using the render cameras 610', 611' as in FIG. 6A. The eyes 610, 611 are vertically offset from the cameras 610', 611'. The right eye Eye_R 611 is aligned through target object M 618 to target position T' 614 on the screen and thus points upwards to look at target image T 614'. The gaze direction 616 is shown as a solid red line. The dashed line 616" from the Eye_R 611 to the display 612 through M 618, shows what the correct position of the target on the screen 612 should have been (T' 614). The vertical error for the right eye is the angle Alpha (T, Eye_R, T'=622). Given that the binocular geometry is symmetric here, the total vertical binocular misalignment is 2× angle Alpha. The binocular misalignment in the FIG. is shown only for an object in front of the focal plane. The misalignment is symmetrical around the focal plane in diopters, such that an object at z diopters in front of the focal plane leads to the same binocular misalignment at z diopters behind the focal plane.

Modifying Virtual Content Based on Range of Operation

Developer Guidelines

In some embodiments, developer guidelines can be developed/modified based on a determined range of operation. For example, developers can be advised to keep 3D content within a certain distance, based on the determined range of operation, from the focal plane.

Clip Plane

Figure 7:
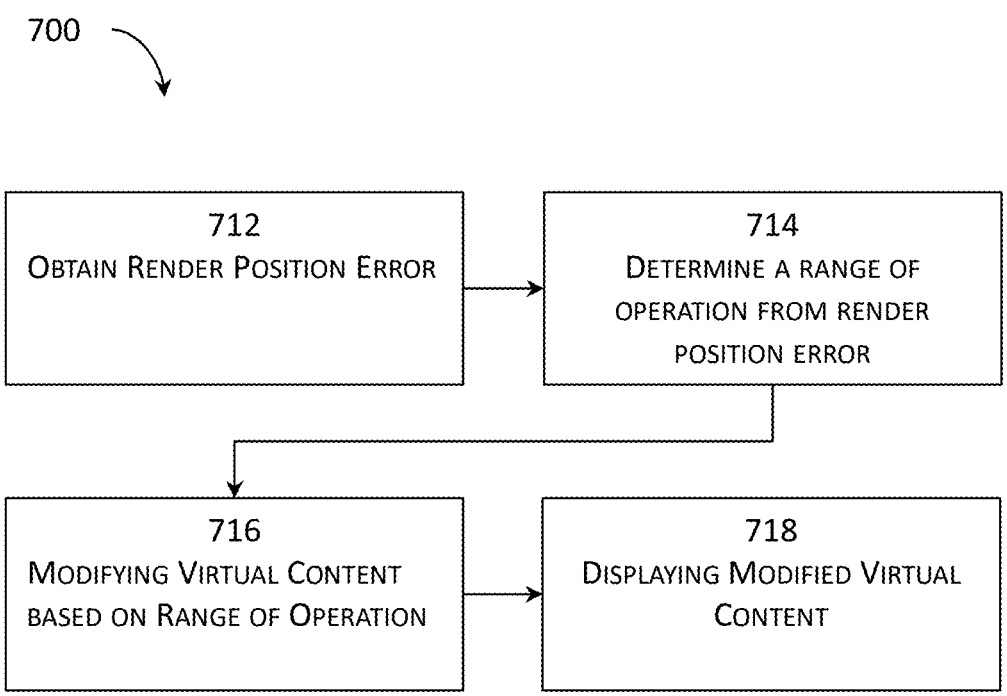
FIG. 7 is a flowchart depicting a method of modifying virtual content before display based on a render position error, according to some embodiments.

In some embodiments, the XR system can clip the content away when it is outside of the determined range of operation (e.g., beyond the farthest value in the determined range of operation). FIG. 7 is a flowchart depicting a method 700 of modifying virtual content before display based on a render position error.

At step 712, the XR system obtains a render position error. In some embodiments, the XR system estimates the render position error by using population data, IPD data, system specific data, user specific data, etc. The user specific data may be obtained from a database, entered by the user using a user interface, and/or obtained from an eye tracking subsystem.

At step 714, the XR system determines a range of operation from at least the render position error as described herein.

At step 716, the XR system modifies the virtual content based at least on the determined range of operation. For instance, the XR system may delete a portion of the virtual content that corresponds to a depth outside (e.g., beyond) the range of operation from the focal plane of the XR system. In other embodiments, the XR system may configure a portion of the virtual content that corresponds to a depth outside (e.g., beyond) the range of operation from the focal plane of the XR system to be displayed monocularly instead of binocularly.

At step 718, the XR system displays the modified virtual content for a user.

The methods described herein modify virtual content based on render position error to prevent binocular depth cues from deviating beyond a comfortable range of operation.

Dynamic Clip Planes Based on Estimated Sighting Center/Render Camera Position

In some embodiments, virtual content can be modified based on render camera position error based on real time dynamic estimations of render camera errors. In some embodiments where the render camera position is estimated using eye tracking, the sighting center/render camera position signal may be noisy. Such a noisy render camera position signal is likely to be accompanied by a poor accuracy in sighting center estimation. To maintain visual comfort in such embodiments, the binocular range of operation can be dynamically increased or decreased based on an estimate of the noise. Similarly, if the eye tracking input is interrupted for any reason, the XR system could fall back to a default small binocular range of operation.

In embodiments where render camera position is estimated using eye tracking, the sighting center error of an individual can be estimated while using the XR system in real-time and virtual content can be modified accordingly based on a determined range of operation. This would be an individual level application of the concepts disclosed herein in addition to or instead of a population level application of those concepts.

In other embodiments, XR systems without eye tracking subsystems implement a dynamic range of operation using another signal that indicates a change in sighting center relative to the headset. Some XR systems asks the user to perform a visual calibration at the beginning of a user session that is used to calculate the sighting center. However, during use the device can slip relative to the head of the user, thereby changing the position of the sighting centers relative to the device and thus the render cameras. The XR system could detect slippage, for example using accelerometers, and then account for the change by making the binocular range of operation smaller. The XR system can make an estimated change to the range of operation based on slippage data from user studies, or the XR system can apply a generic reduction in the range of operation when slippage is detected.

In some embodiments, the XR system reduces the binocular range of operation as a function of time of operation (e.g., continuous operation).

Range of Operation Adjustments Based on User Eye Properties

In some embodiments, when an XR system uses a tracking subsystem to estimate the sighting center/render camera position, the accuracy of that position estimation may be affected by the shape of the cornea of the eye. The shape of a user's cornea may deviate from that of a "normal eye" when the user suffers from keratoconus. As a result, the eye tracking subsystem may not be able to produce an accurate estimation of the sighting center/render camera position. By using information about the user's eye, the XR system may adjust the binocular range of operation in order to accommodate for the expected error resulting from the corneal abnormality. Information about the user's eye may be detected by cameras or it may be entered into the XR system by the user.

System Architecture Overview

Figure 8:
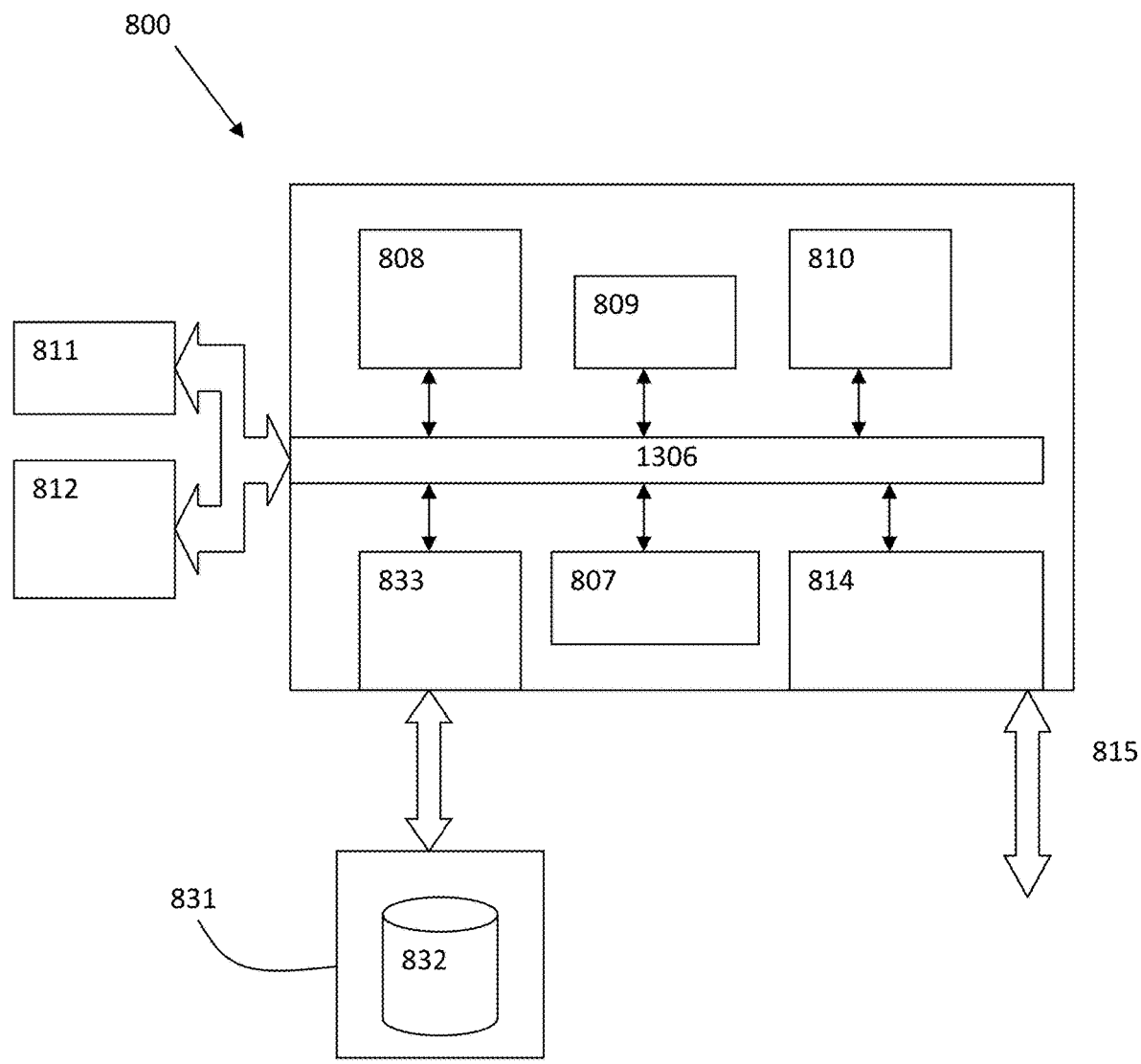
FIG. 8 illustrates an example computing device and some example computing components that may be used to implement at least the compute portion and data processing portion of a wearable electronic device describe herein in some embodiments.

FIG. 8 is a block diagram of an illustrative computing system 800 suitable for implementing an embodiment of the present disclosure. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the disclosure, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media.

Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 800. According to other embodiments of the disclosure, two or more computer systems 800 coupled by communication link 815 (e.g., LAN, PTSN, or wireless network) may perform the sequence of instructions required to practice the disclosure in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. Database 832 in storage medium 831 may be used to store data accessible by system 800 via data interface 833.

Certain aspects, advantages and features of the disclosure have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, and the like described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can include computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general-purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media that, when read by a computer or other processing device, cause it to carry out the method.

While certain embodiments have been explicitly described, other embodiments will become apparent to those of ordinary skill in the art based on this disclosure.

The various processors and other electronic components described herein are suitable for use with any optical system for projecting light. The various processors and other electronic components described herein are also suitable for use with any audio system for receiving voice commands.

Figure 9:
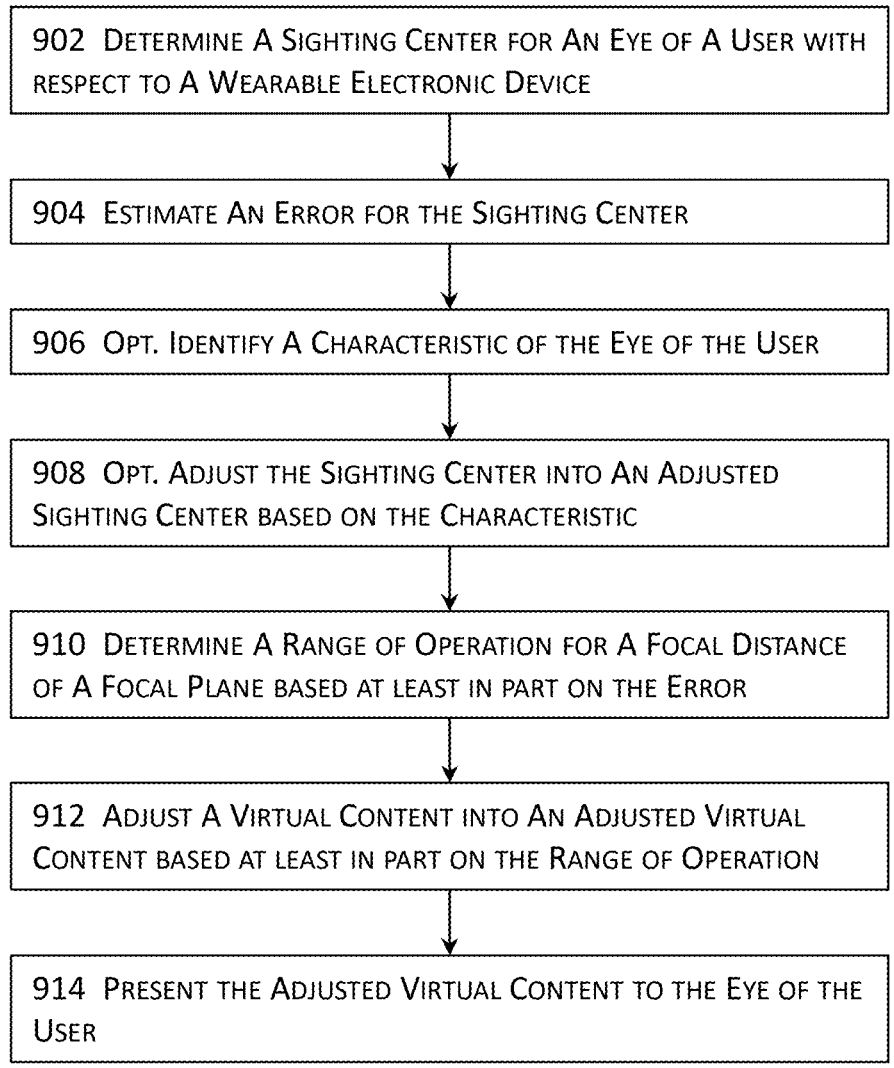
FIG. 9 illustrates a flow diagram for determining a range of operations for binocular perception of virtual contents exhibiting vergence-accommodation conflict in one or more embodiments.

FIG. 9 illustrates a flow diagram for determining a range of operations for binocular perception of virtual contents exhibiting vergence-accommodation conflict in one or more embodiments. In these embodiments, a sighting center may be determined at 902 for an eye or both eyes of a user wearing a wearable electronic device. With the sighting center of the eye determined at 902, an error may be estimated at 904 for the sighting center. For example, the wearable electronic device or a remote computing device (e.g., a server) operatively connected to the wearable electronic device may estimate a render position error or precision, a system error or precision of the wearable electronic device, a residual error or precision at a population level of a plurality of users in addition to the render position error and/or the system error, or any other suitable error or precision that characterizes the accuracy and/or deviation of the determined sighting center from, for example, the ground truth. In some embodiments, the error estimated at 904 comprises at least one of a render camera position error or precision that is specific to the user and the wearable electronic device, a system-level error or precision specific to the wearable electronic device, or a population-level residual error pertaining to a plurality of users.

A characteristic of the eye (or eyes in embodiments where respective sighting centers are determined for both eyes) may be optionally identified at 906. For example, a health characteristic such as keratoconus that represents a condition where the cornea develops a distorted shape producing blurred vision, myopia (e.g., nearsightedness) that causes the cornea to become too big, hyperopia (e.g., farsightedness) that causes the cornea and hence the eye to become too short, stigmatism that causes the eye to become the shape similar to that of a football, or any other characteristics that may affect the shape or geometry of the eye so that the shape or geometry of the eye deviates from common assumption of a spherical shape). In some embodiments, the characteristic of an eye may be provided by the user. In some other embodiments, the characteristic of an eye may be determined or detected by using one or more inward-facing devices (e.g., one or more cameras) having the eye (or eyes) of the user within their respective fields of view so that these one or more inward-facing devices may, for example, capture data (e.g., multiple images captured from different angles of at least a portion of the eye) for the eye of interest from one or more perspectives and use the captured data to determine whether, how, and/or how much the eye has deviated from a spherical shape.

In some embodiments where one or more characteristics of the eye are identified at 906, the sighting center determined at 902 may be optionally adjusted at 908 into an adjusted sighting center based at least in part upon these one or more characteristics. In the preceding example where one or more inward-facing devices captured data for an eye of the user and determined whether, how, and/or how much the eye has deviated from a spherical shape, the sighting center estimated at 904 may be adjusted based at least in part upon the data pertaining to whether, how, and/or how much the eye has deviated from a spherical shape.

A range of operation for a focal distance of a focal plane or the focal plane of the wearable electronic device may be determined at 910 based at least in part upon the error determined at 904 and one or more criteria, factors, or characteristics pertaining to vergence and accommodation of binocular vision of virtual contents (e.g., virtual contents presented to a user by a wearable electronic device described herein). The range of operation may comprise a binocular range of operation and may be determined to address the horizontal binocular misalignment, vertical binocular misalignment, and/or vergence-accommodation conflict, etc., which, when exceeding some threshold value (e.g., vergence-accommodation greater than a first threshold arcminutes or smaller than a second threshold arcminutes, etc.) may be common in perceiving virtual contents when a user's brain receives mismatching cues between vergence and accommodation of the eye(s) to provide a comfortable user experience in perceiving virtual contents. In some of these embodiments, the range of operation may be determined at 910 based further in part upon the error or precision pertaining to one or more characteristics optionally identified at 906.

A virtual content rendered according to the aforementioned focal plane or the focal distance may be adjusted into an adjusted virtual content at 912 based at least in part upon the range of operation determined for the focal plane or the focal distance at 910. For example, a portion of the virtual content that is to be rendered beyond the determined range of operation may be suppressed, clipped, blurred, or deleted by using, for example, blending or a clipping plane. As another example, a portion of the virtual content that is to be rendered beyond the determined range of operation may be rendered for monocular display, etc. to reduce or ease the vergence-accommodation conflict. The adjusted virtual content may then be presented at 914 by, for example, projecting light beams corresponding to the adjusted virtual content with one or more micro-projectors or optical fibers of the wearable electronic device to the eyes of the user.

Figure 10:
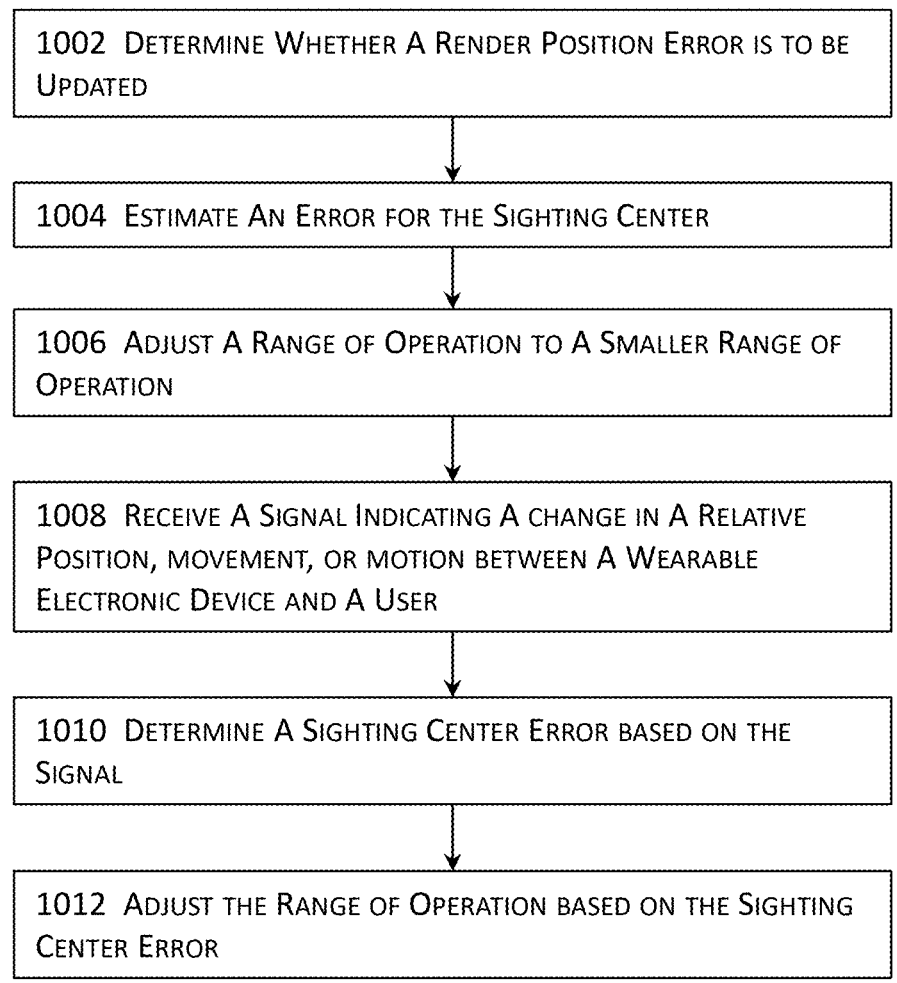
FIG. 10 illustrates a flow diagram for dynamically or in real-time updating a sighting center of an eye of a user wearing a wearable electronic device in one or more embodiments.

FIG. 10 illustrates a flow diagram for dynamically or in real-time updating a sighting center of an eye of a user wearing a wearable electronic device in one or more embodiments. In these one or more embodiments, whether a render position error is required or desired to be updated may be determined at 1002. For example, the aforementioned determination may be made based at least in part on a threshold period of time since the last update on the render position error. As another example, the aforementioned determination may be made when a position, movement, or motion sensor(s) (e.g., an accelerometer, a movement sensor, a motion sensor detects a threshold magnitude of motion, movement, displacement, or change in position, etc. (e.g., acceleration, movement, displacement, etc.) of the wearable electronic device relative to the wearing user.

An error may be determined at 1004 for a sighting center of an eye of the user. In some of these embodiments, a render position error corresponds to a sighting center error and may be determined on an individual user basis by, for example, using an eye tracking module that estimates the sighting center—the center position—of an eye of a user. Images may be presented by, for example, respective projectors to the left and right eyes of the user.

The left and right projectors are located at their respective render camera positions and project image data or signals (e.g., light beams) to the presumed sighting centers of the eyes of the user. Nonetheless, a render position error may be caused by the respective misalignment (e.g., horizontal and/or vertical misalignment) between the sighting centers presumed by the rendering devices based on the estimated sighting centers of the eyes of the user and the true sighting centers of the eyes of the user and may thus be determined accordingly.

In some embodiments, a render position error may be determined on an individual basis for a user based at least in part upon, for example, the estimated sighting centers determined by using an eye tracking module, by an execution of a visual task that determines the sighting center(s), the inter-pupil distance of the user, or one or more characteristics pertaining to the eye(s) of the user, or any other suitable individual factors or characteristics of the user. In some of these embodiments, a render position error may be further determined or adjusted statistically at a population level. For example, a render position error or a component thereof (e.g., a residual error component) may be determined at a population level by using, for example, an error distribution of a representative group of users collected in a ground truth test setup.

In some of these embodiments, a preexisting range of operation (e.g., a range of operation determined according to one or more embodiments illustrated in FIG. 9 and described above) may be optionally adjusted at 1006 into a smaller range of operation when it is determined that the render position error is required or desired to be updated at 1002. It shall be noted that the adjustment at 1006 may be an optional implementation where a wearable electronic device first adjusts the range of operation currently in force into a smaller, adjusted range of operation (e.g., by decreasing the range of operation, by setting the range of motion to a predetermined minimal range of motion) so that discomfort arising out of the lack of update on the render position error may be reduced, and this adjustment is performed prior to the determination of a sighting center error at 1010 and the adjustment of the range of operation (or the smaller range of operation if the adjustment is performed 1006 in some embodiments) at 1012.

In some of these embodiments, a signal indicating that a change in a relative position, movement, or motion between the wearable electronic device and a user wearing the wearable electronic device is received at 1008. In some embodiments, such signals may be generated by, for example, an accelerometer, a movement sensor, a motion sensor, or any other sensors, devices, and/or routines that may discern a chance in the relative position, movement, or motion between the user (e.g., one or more anchor points such as one or more points used by a wearable electronic device to register its position relative to the user) and the wearable electronic device.

A sighting center may then be determined at 1010 based at least in part upon the signal received at 1008. In some embodiments, the sighting center may be determined anew at 1010 (e.g., by using an eye tracking module or by a visual task described herein) after receiving the signal at 1008. In some other embodiments, the sighting center may be determined by modifying the existing sighting center based at least in part upon the signal. For example, in some embodiments where the signal indicates a change in the relative position between the user and the wearable electronic device, the sighting center may be determined based on the detected change.

As another example, in some embodiments where the signal indicates the existence of an acceleration for a duration of time, a resultant force (e.g., a two-dimensional force vector on a plane parallel to the plane connecting the two sighting centers of the eye or a three-dimensional force vector) exerted on the wearable electronic device may be determined, and a relative movement of the wearable electronic device relative to the user may be predicted by using the aforementioned resultant force and the duration of time. An existing sighting center may then be determined based on the predicted relative movement. With the sighting center determined, a sighting center error may be determined at 1010 based at least in part upon the signal by using techniques described herein.

With the sighting error determined at 1010, the range of operation (or the smaller range of operation of the optional adjustment is performed at 1006 in some embodiments) may be adjusted at 1012 (e.g., increase or decrease an existing range of operation) based at least in part upon the sighting center error. For example, the signal received at 1008 may indicate a slippage of the wearable electronic device relative to the wearing user. The corresponding sighting center error may then be determined to increase. Due to the increase in the sighting center error, the diopter for the focal plane (e.g., the focal plane at 74 cm in the example above) increases (e.g., from +/−1.35 diopter to +/−1.45 diopter) and hence reduces the range of operation from the original 37 cm to infinity to 35 cm (e.g., the focal length is now 100/1.45~70 cm, and hence the range of operation is now reduced to 35 cm to infinity).

It shall be noted that the signal may not necessarily always indicate that the sighting center is shifted in a manner to cause the range of operation to decrease. In some embodiments, the signal may indicate that the change in position, movement, or motion of the wearable electronic device relative to the user actually causes the sighting center to move closer to the true sighting centers. In these embodiments, the range of operation may thus be increased based at least in part upon the signal. It shall be further noted that various embodiments illustrated in FIG. 10 may be performed periodically (e.g., once every fixed duration of time), dynamically, or in real-time, with or without referencing to a threshold period of time for the performance of these techniques.

Figure 11:
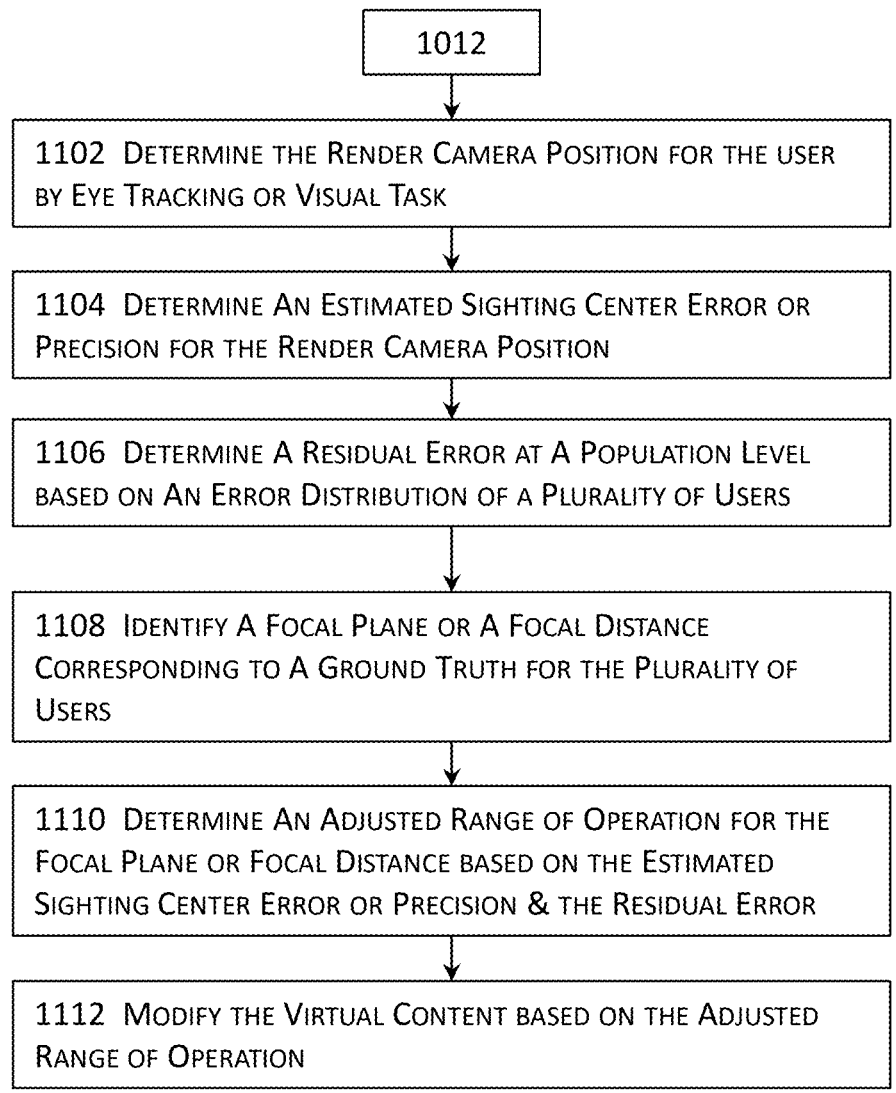
FIG. 11 illustrates a block diagram for more details about adjusting a range of operation of FIG. 10 in some embodiments.

FIG. 11 illustrates a block diagram for more details about adjusting a range of operation at 1012 of FIG. 10 in some embodiments. In these embodiments, a render camera position may be determined at 1102 for the user by using an eye tracking module or by performing a visual task for finding a render camera position. An estimated sighting center error or precision may be determined at 1104 by using techniques described herein based at least in part upon the render camera position determined at 1102.

A residual error for the sighting center position or the render camera position may be determined at 1106 at a population level. For example, a render position error or a component thereof (e.g., a residual error component) may be determined at a population level by using, for example, an error distribution of a representative group of users collected in a ground truth test setup. A focal distance or a focal plane corresponding to the focal distance that corresponds to a ground truth for the plurality of users may be identified at 1108. The focal plane or the focal distance is identified at 1108 because a range of operation is to be determined based on the diopter that corresponds to a specific focal plane or focal depth, length, or distance.

An adjusted range of operation may be determined at 1110 for the focal plane or the focal distance based at least in part upon the estimated sighting center error or precision in some embodiments. In some of these embodiments, the adjusted range of operation may be determined at 1110 for the focal plane or the focal distance based further at least in part upon the residual error. With the adjusted range of operation determined at 1110, the virtual content to be presented with respect to the focal plane (or focal length, distance, or depth) may be modified at 1112 into a modified virtual content based at least in part upon the adjusted range of operation.

Figure 12:
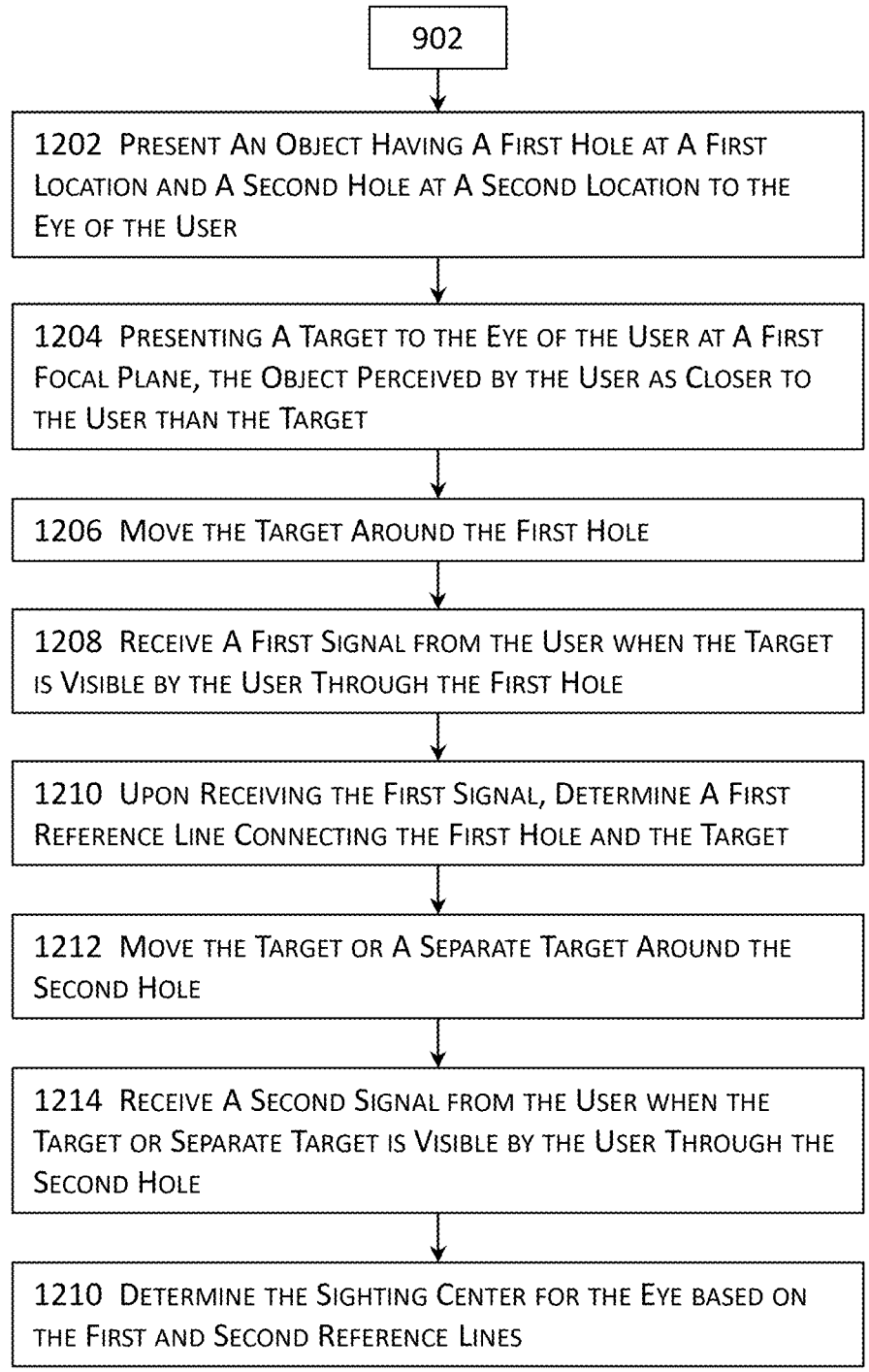
FIG. 12 illustrates a block diagram for more details about determining a sighting center of an eye of a user of FIG. 9 in some embodiments.

FIG. 12 illustrates a block diagram for more details about determining a sighting center of an eye of a user at 902 of FIG. 9 in some embodiments. More particularly, FIG. 12 illustrates a block diagram for determining a sighting center of an eye with a visual task. In these embodiments, an object having a first hole at a first location and a second hole at a second location is presented at 1202 to an eye of a user. In some of these embodiments the object includes a virtual object that includes a plurality of through holes so that the user may see through the plurality of holes to see the real-world environment or another virtual object behind the object.

In some other embodiments, rather than presenting an object with through holes to a user, a first marker (e.g., a reticle, a dot, a regular or irregular shape, a pattern, etc.) may be presented at the first location to the eye of the user; and a second marker may be presented at the second location to the eye of the user. Therefore, the reference to a "hole" may be used interchangeably with the reference to a "marker" in various embodiments illustrated in FIG. 12 and described herein.

A target of any shape or pattern may be presented at 1204 to the eye of the user and may have (e.g., a shape is considered to have a size) or have not a size (e.g., a dot is considered as having no size). In some of these embodiments, the rendering depth of the target is greater than that of a hole in the aforementioned object or a marker. In some other embodiments, the rendering depth of a target may be equal to that of a hole in the aforementioned object or a marker. Yet in other embodiments, the rendering depth of a target may be smaller than that of a hole in the aforementioned object or a marker. One of the objectives of a target and a hole (or a marker) is to align the hole (or marker) with the target in order to establish a reference line along which the sighting center of the eye lies. Therefore, whether a target is present at the same depth, at a less depth, or at a greater depth than a hole (or marker) may be determined based at least in part upon the type or types of holes and targets selected.

The target may be moved around the first hole at 1206 either by the user with an input (e.g., by using a physical or virtual point device, the up, down, left, and/or right arrow keys on a physical or virtual keyboard, gesture(s), or interaction with on-display widget(s) pertaining to moving the target, etc.) In some embodiments where the target is rendered at a longer focal distance or depth than the first hole in the object, the object occludes the target until the target is moved to a location where at least a portion of the target becomes visible by the eye of the user through the first hole.

When the eye of the user perceives at least a portion the target through the hole, a signal indicating that at least a portion of the target is visible by the eye through the first hole may be received at 1208. For example, a user may issue a visual, audible, or other types of command or instruction to indicate that at least a portion of the target is visible by the eye of the user through the first hole. Upon receiving the signal, the wearable electronic device is made aware that the target and the first hole are aligned within a certain tolerance (e.g., the alignment precision depends upon the size of the first hole, the size of the target, or both).

Smaller targets and/or smaller holes may provide high precision for alignment between a target and a hole but may be harder to perceive by eyesight. On the other hand, a larger target and/or a larger hole may provide better visibility but the alignment errors are larger. A balanced approach may be using a bigger size target and/or a bigger hole, and when the target first becomes visible, the target is moved along the same direction across the hole until the moment that the target is no longer visible by the eye of the user. The final aligned position for the moving target is then the midpoint between the first point when the target first becomes visible and the second point when the target last becomes visible.

In some embodiments where a marker, instead of a through hole in an object, is used, the target and the marker may be devised in such a way to provide visible distinctions when any portion of the target is not aligned with the marker. For example, the target may be implemented as a crosshair of a first color, and the marker may be implemented as another crosshair of a second color that is different from the first color. During the alignment process, any non-overlapping representation between the target and the marker may be emphasized due to the two contrast colors. In some embodiments, a wearable electronic device may further magnify the display area showing the target and the hole (or the marker) to provide a close-up and thus magnified view of the target and the hole (or marker) in order to achieve higher precision. In some embodiments, a target may be rendered in such a way that the target appears to be smaller than the hole so that a user may determine whether to trigger the first signal described in 1208 when the gap between the outer edge of the target and the edge of the hole appears to be uniform.

Upon receiving the first signal at 1208, a first reference entity (e.g., a line, a plane, etc.) that connects the first hole (or marker) and the target may be determined at 1210. More specifically, the first signal indicates that the target and the hole (or the marker) as aligned with each other when perceived by the eye of the user. Therefore, an assumption may be made that the sighting center of the eye of the user may lie along the first reference entity.

A substantially similar process may be performed for the eye of the user by moving the target (or a different target) around a second hole (or a second marker). For example, the same target (or a second target) may be moved around the second hole (or the second marker) at 1212. A signal may then be triggered by and received from the user when the target (or the second target) becomes visible to the eye of the user through the second hole (or is aligned with the second marker) at 1214. Upon receiving the second signal, the target (or the second target) and the second hole (or the second marker) are considered as being aligned with each other when perceived by the eye of the user. Therefore, another assumption may be made that the sighting center of the eye of the user may also lie along the second reference entity. With the first and the second reference entities, the sighting center of the eye may then be determined to be the intersection of the first and the second reference entities. A substantially similar process may be performed for the other eye of the user.

Eye Tracking

In one or more embodiments, the AR system may track eye pose (e.g., orientation, direction) and/or eye movement of one or more users in a physical space or environment (e.g., a physical room). The AR system may employ information (e.g., captured images or image data) collected by one or more sensors or transducers (e.g., cameras) positioned and oriented to detect pose and or movement of a user's eyes. For example, head worn components of individual AR systems may include one or more inward facing cameras and/or light sources to track a user's eyes.

As noted above, the AR system may track eye pose (e.g., orientation, direction) and eye movement of a user, and construct a "heat map". A heat map may be a map of the world that tracks and records a time, frequency and number of eye pose instances directed at one or more virtual or real objects. For example, a heat map may provide information regarding what virtual and/or real objects produced the most number/time/frequency of eye gazes or stares. This may further allow the system to understand a user's interest in a particular virtual or real object.

Advantageously, in one or more embodiments, the heat map may be used in advertising or marketing purposes and to determine an effectiveness of an advertising campaign, in some embodiments. The AR system may generate or determine a heat map representing the areas in the space to which the user(s) are paying attention. In one or more embodiments, the AR system may render virtual content (e.g., virtual objects, virtual tools, and other virtual constructs, for instance applications, features, characters, text, digits, and other symbols), for example, with position and/or optical characteristics (e.g., color, luminosity, brightness) optimized based on eye tracking and/or the heat map.

Pseudo-Random Pattern

In one or more embodiments, the AR system may employ pseudo-random noise in tracking eye pose or eye movement. For example, the head worn component of an individual AR system may include one or more light sources (e.g., LEDs) positioned and oriented to illuminate a user's eyes when the head worn component is worn by the user. The camera(s) detects light from the light sources which is returned from the eye(s). For example, the AR system may use Purkinje images, e.g., reflections of objects from the structure of the eye.

The AR system may vary a parameter of the light emitted by the light source to impose a recognizable pattern on emitted, and hence detected, light which is reflected from eye. For example, the AR system may pseudo-randomly vary an operating parameter of the light source to pseudo-randomly vary a parameter of the emitted light. For instance, the AR system may vary a length of emission (ON/OFF) of the light source(s). This facilitates automated detection of the emitted and reflected light from light emitted and reflected from ambient light sources.

Figure 13:
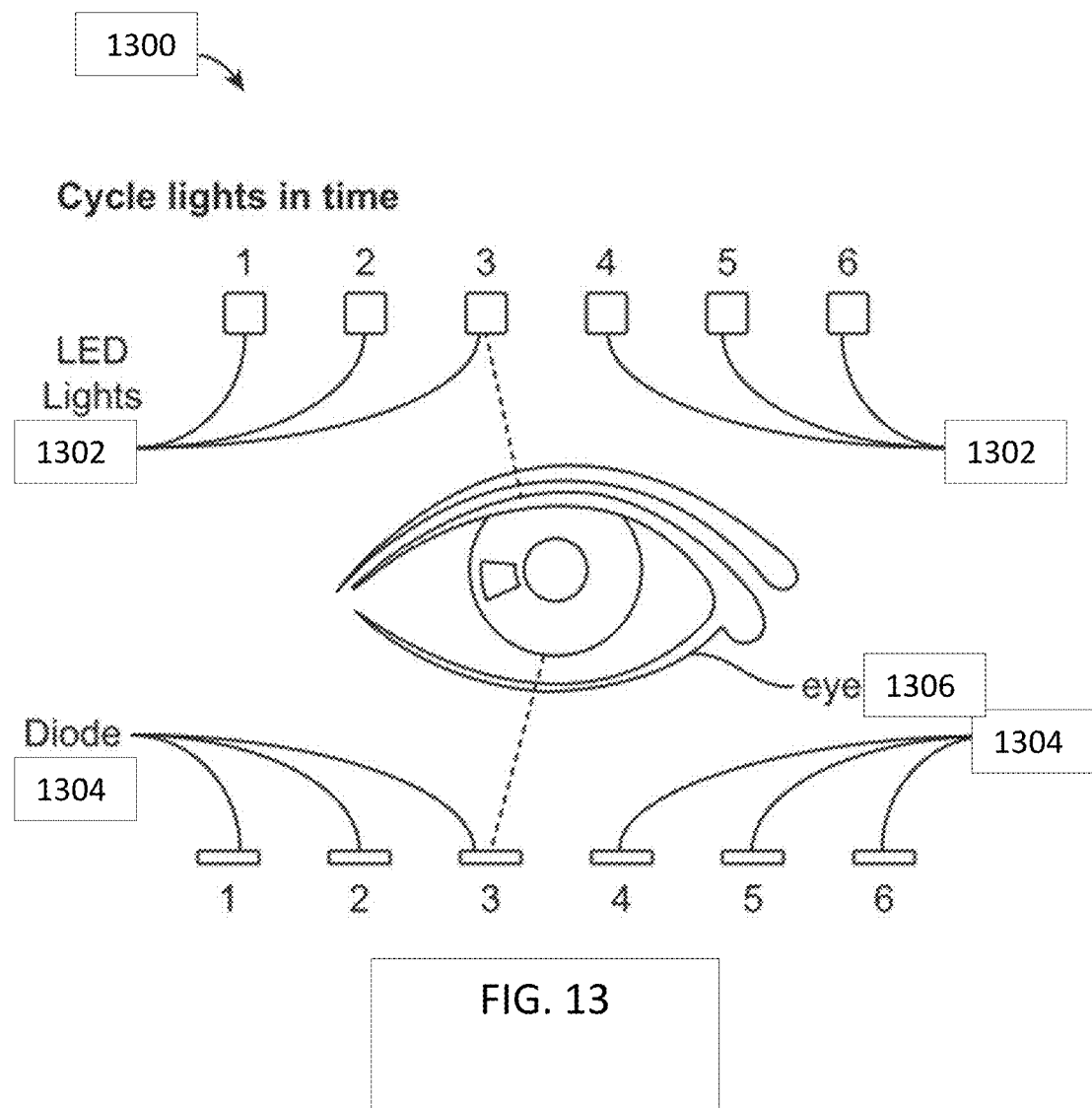
FIG. 13 illustrates a schematic implementation of an eye tracking instrumentation that is simplified for illustration and description purposes in some embodiments.
Figure 14:
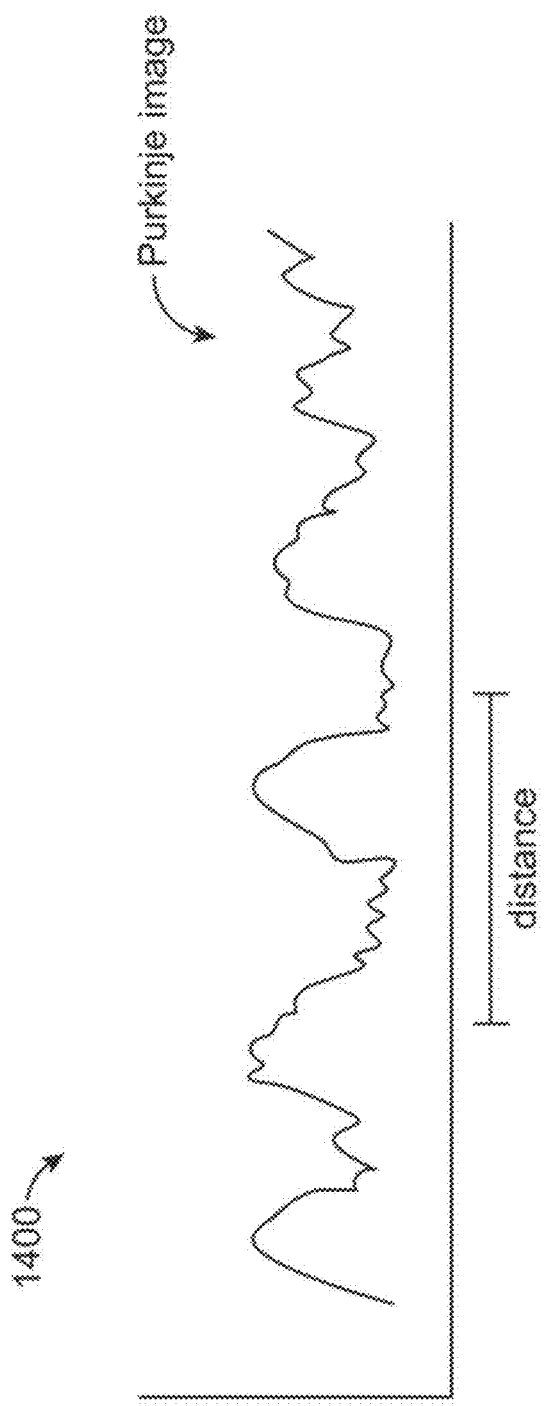
FIG. 14 illustrates an example output of reflections of lights, pattern(s), or object(s) from the structure of an eye of a user captured by one or more sensors (e.g., one or more photodiodes) in some embodiments.

FIG. 13 illustrates a schematic implementation of an eye tracking instrumentation that is simplified for illustration and description purposes in some embodiments. FIG. 14 illustrates an example output of reflections of lights, pattern(s), or object(s) from the structure of an eye of a user captured by one or more sensors (e.g., one or more photodiodes) in some embodiments.

As illustrated in FIG. 13 and FIG. 14, in one implementation, light sources (e.g., LEDs) 10102 are positioned on a frame on one side (e.g., top) of the eye and sensors (e.g., photodiodes) are positioned on the bottom part of the frame. The eye may be seen as a reflector. Notably, only one eye needs to be instrumented and tracked since pairs of eyes tend to move in tandem. The light sources 10102 (e.g., LEDs) are normally turned ON and OFF one at a time (e.g., time slice) to produce a patterned code (e.g., amplitude variation or modulation). The AR system performs autocorrelation of signals produced by the sensor(s) (e.g., photodiode(s)) to determine a time-of-flight signal. In one or more embodiments, the AR system employs a known geometry of the light sources (e.g., LEDs), the sensor(s) (e.g., photodiodes), and distance to the eye.

The sum of vectors with the known geometry of the eye allows for eye tracking. When estimating the position of the eye, since the eye has a cornea and an eyeball, the geometry may be represented as two circles layered on top of each other. Using this system 10100, the eye pointing vector may be determined or calculated with no cameras. Also, the eye center of rotation may be estimated since the cross section of the eye is circular and the cornea swings through a particular angle. This actually results in a vector distance because of autocorrelation of the received signal against known transmitted signal, not just ray traces. The output may be seen as a Purkinje image 1400, as shown in FIG. 14, which may in turn be used to track movement of the eyes.

In some implementations, the light sources may emit light in the infrared (IR) range of the electromagnetic spectrum, and the photosensors may be selectively responsive to electromagnetic energy in the IR range.

In one or more embodiments, light rays are emitted toward the user's eyes as shown in the illustrated embodiment. The AR system is configured to detect one or more characteristics associated with an interaction of the light with the user's eyes (e.g., Purkinje image, an extent of backscattered light detected by the photodiodes, a direction of the backscattered light, etc.). This may be captured by the photodiodes, as shown in the illustrated embodiments. One or more parameters of the interaction may be measured at the photodiodes. These parameters may in turn be used to extrapolate characteristics of eye movements or eye pose.

Gaze Tracking

It should be appreciated that the concepts outlined with respect to gaze tracking may be applied to any of the user scenarios and embodiments described further below. In one or more embodiments, the various user interfaces described below may also be activated/originated back to a detected gaze. The principles described herein may be applied to any other part of the disclosure, and should not be read as limiting.

The AR system may track eye gaze in some embodiments. There are three main components to gaze tracking: an eye tracking module (pupil detection and center of cornea detection), a head tracking module, and a correlation module that correlates the eye tracking module with the head tracking module. The correlation module correlates the information between the world coordinates (e.g., position of objects in the real world) and the eye coordinates (e.g., movement of the eye in relation to the eye tracking cameras, etc.).

Figure 15:
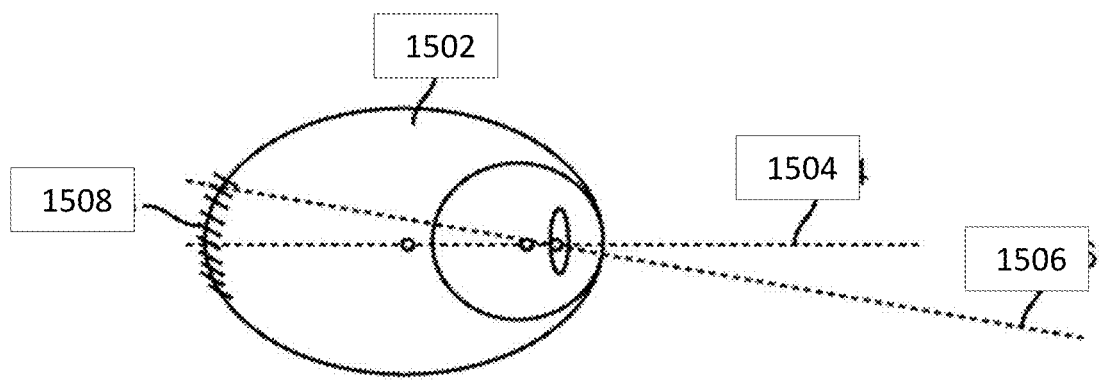
FIG. 15 illustrates a simplified schematic of an eye in some embodiments.

The eye tracking module is configured to determine the center of the cornea and the center of the pupil. Referring ahead to FIG. 15, a schematic of the eye 1502 is illustrated. As shown in FIG. 15, a line 1504 is shown to pass through the center of the cornea, the center of the pupil, and the center of the eyeball. This line 1504 may be referred to as the optical axis.

FIG. 15 also shows another gaze line 1506 that passes through the cornea. This line may be referred to as the visual axis. As shown in FIG. 15, the visual axis is a tilted line in relation to the optical axis. It should be appreciated that the area of the fovea 1508 through which the visual axis 1506 crosses is considered to be a very dense area of photoreceptors, and therefore crucial for the eye in order to view the outside world. The visual axis 1506 is typically at a 1-5° deviation (not necessarily vertical deviation) from the optical axis.

In conventional gaze tracking technologies, one of the main assumptions is that the head is not moving. This makes it easier to determine the visual axis in relation to the optical axis for gaze tracking purposes. However, in the context of the AR system, it is anticipated that the user will be constantly moving his/her head; therefore, conventional gaze tracking mechanisms may not be feasible.

To this end, the AR system is configured to normalize the position of the cornea in relation to the system. It should be appreciated that the position of the cornea is very important in gaze tracking because both the optical axis and the visual axis pass through the cornea as shown in the previous FIG. 15.

Figure 16:
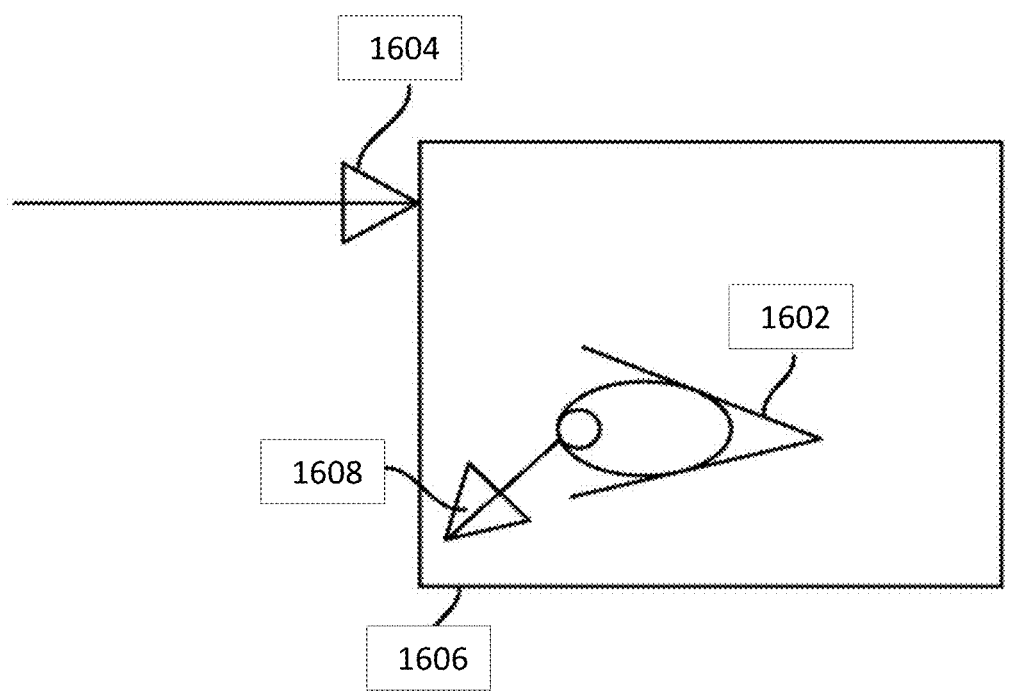
FIG. 16 shows another perspective of the eye and one or more cameras for gaze tracking and identification of sighting center(s) according to one or more embodiments.

Referring now to FIG. 16, the AR system comprises a world camera system (e.g., cameras placed on the user's head to capture a set of surroundings; the cameras move with the movement of the user's head) 1604 that is attached to the wearable AR system 1606. Also, as shown in FIG. 16, the AR system 1606 may further comprise one or more eye tracking cameras 1608 that track movements of the eye 1602. Since both cameras (e.g., eye tracking cameras 1608 and the world cameras 1604), are moving, the system may account for both head movement and eye movement. Both the head movement (e.g., calculated based on the field-of-view (FOV) cameras 1604), and the eye movement (e.g., calculated based on the eye tracking cameras 1608) may be tracked in order to normalize the position of the cornea.

It should be appreciated that the eye tracking cameras 1608 measure the distance from the cameras to the center of the cornea. Thus, to compensate for the any changes in how the wearable AR system 1606 moves with respect to the eye, the distance to the center of the cornea is normalized. For example, with eye glass movement, there may be a slight rotation and/or translation of the cameras away from the cornea. However, the system compensates for this movement by normalizing the distance to the center of the cornea.

It should be appreciated that since both the eye tracking cameras and the head camera (world cameras) are rigid bodies (e.g., the frame of the AR system), any normalization or correction of the eye tracking cameras needs to also be similarly performed on the world cameras. For example, the same rotation and translation vector may be similarly applied to the world camera system. Thus, this step identifies the relationship between the eye tracking and head tracking systems (e.g., a rotational vector, a translational vector, etc.).

Once the rotation and/or translation vectors have been identified, a calibration step is performed at various depths away from the user. For example, there may be known points that are at a fixed distance away from the user. The world cameras 1604 may measure the distance between a point that is fixed in space from the user. As discussed above, a position of the center of the cornea is also known based on calculations associated with the eye tracking cameras 1608.

Additionally, as discussed above, the relationship between the eye tracking camera 1608 and the world camera is also known (e.g., any translational or rotational vectors). Thus, it may be appreciated that once the position of the target (e.g., fixed known points in space) and the position of the cornea have been identified, the gaze line (from the cornea to the target) may be easily identified. This information may be used in mapping and/or rendering in order to accurately portray virtual objects in space in relation to one or more real objects of the physical world.

More particularly, to determine the relationship between the world camera 1604 and the eye tracking camera 1606, at least two fixed images may be presented both to the eye camera and the world camera and the difference in the images may be used to calibrate both cameras. For instance, if the center of the cornea is known in relation to the eye tracking system 1608, the center of the cornea may be determined in relation to the world coordinate system 1604 by utilizing the known relationship between the eye cameras and the world cameras.

In one or more embodiments, during a calibration process (e.g., during a set-up process when the user first receives the AR device, etc.), a first fixed image is captured by the eye camera 1606 and then the world camera 1604. For illustrative purposes, the first image capture performed by the eye camera may be considered "E", and the first image capture performed by the world camera may be considered "W". Then, a second fixed image is captured by the eye camera 1606 and then captured by the world camera 1604. The second fixed image may be at a slightly different position than the first fixed image.

The second image capture of the eye camera may be referred to as E' and the second image capture of the world camera may be referred to as W'. Since Z=WXE and Z=W'XE', X may be easily calculated using the above two equations. Thus, this information may be used to map points reliably to naturally calibrate the position of the cameras in relation to the world. By establishing this mapping information, the gaze line 1506 may be easily determined, which may, in turn, be used to strategically provide virtual content to the user.

Figure 17:
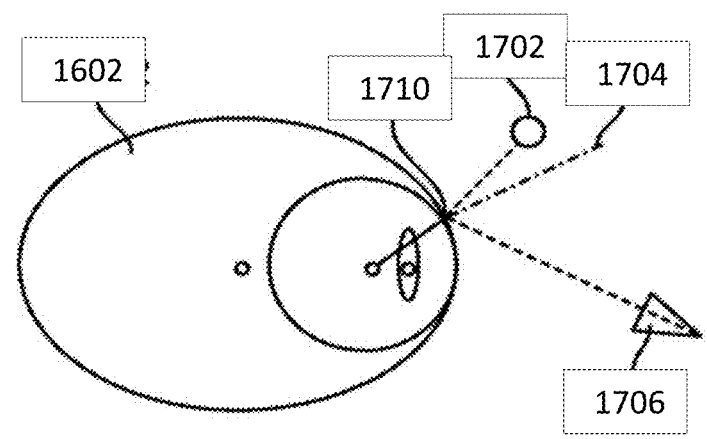
FIG. 17 illustrates yet another perspective of the eye and one or more cameras for gaze tracking and identification of sighting center(s) according to one or more embodiments.

Referring now to FIG. 17, to detect the center of the cornea using the eye tracking module, the AR system utilizes either one camera with two glints (e.g., LED lights) or two cameras with one glint each. In the illustrated embodiment, only one glint 1702 is shown in relation to the eye 1602 and the eye tracking camera 1606. It should be appreciated that the surface of the cornea is very reflective and thus, if there is a camera that tracks the eye (e.g., the eye tracking cameras), there may be a glint that is formed on the image plane of the camera.

Since the 3D position of the LED light 1702 is known, and the line from the image plane of the camera to the glint 1710 is known, a 3D plane comprising the glint and the image plane is created. The center of the cornea is located on this created 3D plane 1704 (which is represented as a line in FIG. 17). Similarly, if another glint (from another LED light) is used, the two 3D planes intersect each other such that the other 3D plane also has the center of the cornea. Thus, it may be appreciated that the intersection of both 3D planes produces a line which holds the center of the cornea. Now the exact point of the cornea within that line may be determined.

It should be appreciated that there is a unique position on that line (from the glint to the projector) that satisfies reflection law. As is well known in physics, the law of reflection states that when a ray of light reflects off a surface, the angle of incidence is equal to the angle of reflection. This law may be used to find the center of the cornea.

Figure 18:
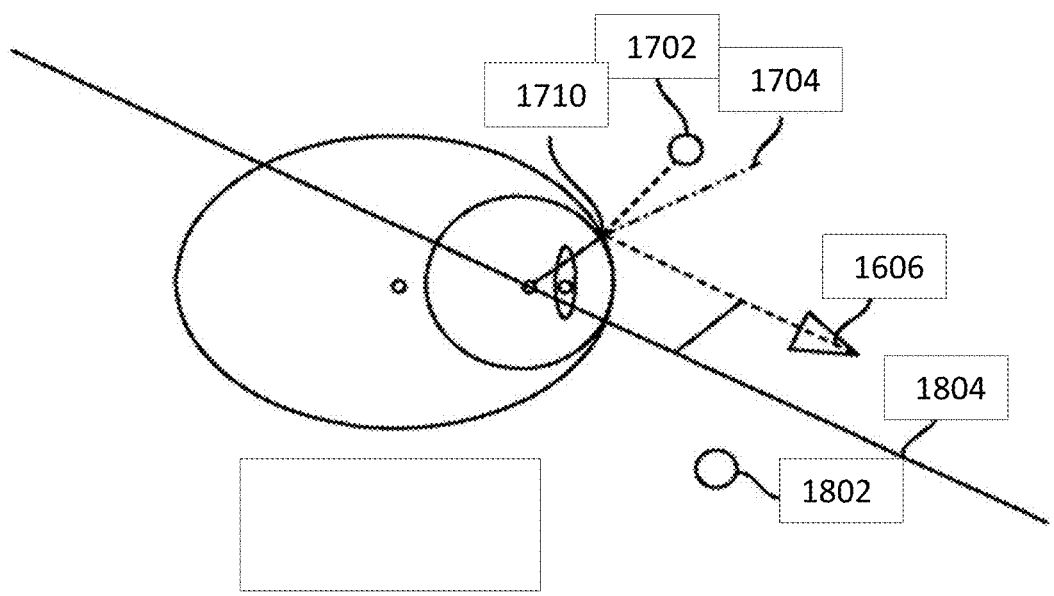
FIG. 18 illustrates yet another perspective of the eye and one or more cameras for gaze tracking and identification of sighting center(s) according to one or more embodiments.

Referring to FIG. 18, now the distance from center of the cornea to the original point (e.g., the glint 1710) may be determined (r', not shown). Similarly, the same analysis may be performed on the other line 1804 (from the other glint 1802 to the other projector) to find r'' (e.g., the distance from the intersection line to the other line) (not shown). The center of the cornea may be estimated based on the value of r' and r'' that are closest in value to each other. It should be appreciated that the above example embodiment describes two planes, but the position of the cornea may be found more easily if more planes are used. This may be achieved by using a plurality of LED lights (e.g., more glints).

It is important that the eye tracking system produce at least two glints on the eye. To increase accuracy, more glints may be produced on the eye. However, with the additional glints produced on the surface of the eye, it becomes difficult to determine which glint was produced by which LED. To this end, to understand the correspondences between the glint and the LED, rather than simultaneously reflecting the glints on each frame, one LED may be turned on for one frame, and the other may be turned on after the first one has been turned off. This approach may make the AR system more reliable.

In some embodiments, it may be difficult to determine the exact center of the pupil because of discrepancies caused by refraction. To detect the center of the pupil, an image of an eye may be captured. One may move around the center of the image in a "starburst" pattern radially outward from a central point in order to find the pupil. Once that is found, the same process may be performed starting from points within the pupil to find edges of the pupil. This information may be used to infer the pupil center. It should be appreciated that if this process is repeated several times, some center may be outliers. However, these outliers may be filtered out. Even with this approach, however, the center of the pupil may still not be in the correct position because of refraction principle discussed above.

Figure 19:
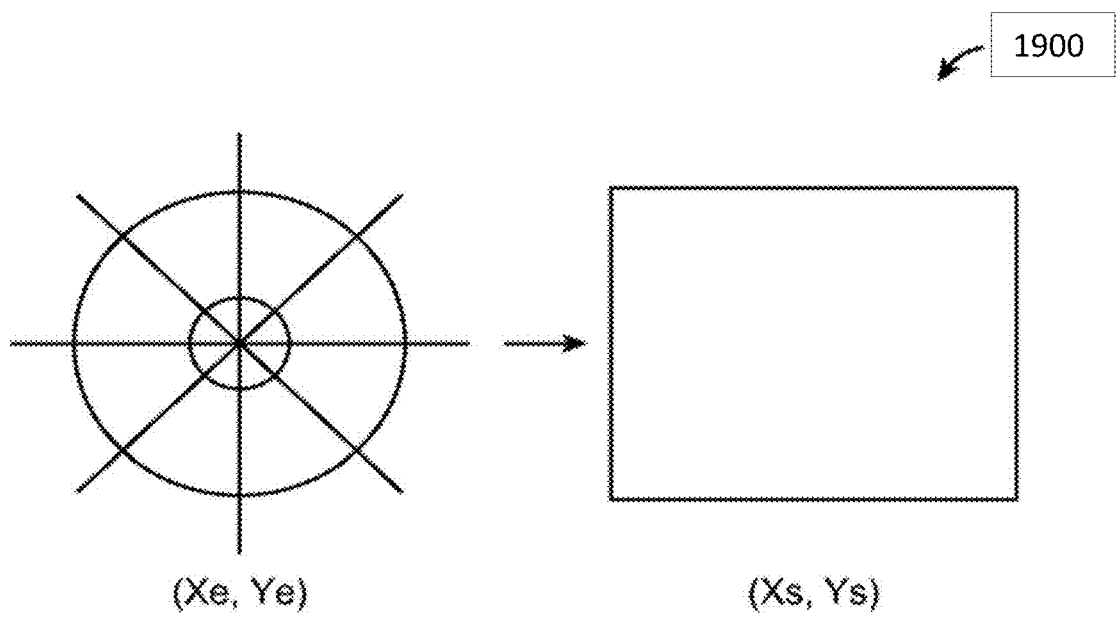
FIG. 19 illustrates a translational matrix view for gaze tracking and identification of sighting center(s) according to one or more embodiments.

Referring now to FIG. 19, calibration may be performed to determine the deviation between the visual axis and the optical axis. When calibrating the system, the real center of pupil may not matter, but for mapping in the world (consider, for example, the world to be in 2D for, example), it is important to determine the distance between the world and the eye. Given the pupil center and the image plane, it is important to find a mapping to find the correlated coordinates in the 2D world, as shown in FIG. 19. To this end, one may use parabola mapping to find the corresponding coordinates in the image plane. A sample equation like the following may be used:

$$X_s = a1xe2 + a2ye2 + a3xeye + a4xe + a5ye + a6$$

$$X_s = fx(Xe, Ye)$$

$$Y_s = fy(Xe, Ye)$$

As shown in 1900 of FIG. 19, equations similar to the above may be used to determine (Xs, Ys) from the determined (Xe, Ye). Here, the total parameters are twelve. Each point provides two equations; therefore at least six points (e.g., a1-a6) may be needed to solve this equation.

Now that the center of the cornea is known, and a position of a target point is known, a line may be drawn from the center of the cornea to the target point. The world camera 1604 has a fixed plane that takes the image, which may take the image at a fixed point in space. Then another target point is displayed to the person, and then the intersection plane that is virtually attached to the world camera is determined.

The mapping techniques described above may be used to determine the corresponding point within that intersection plane, as described in detail above. Knowing the center of the cornea, the mapping techniques described above may identify the points on the image plane virtually attached to the world cameras. Given that all these points are now known, a gaze line may be built from the center of the cornea to the point on the image plane. It should be appreciated that the gaze line is built for each eye separately.

Figure 20:
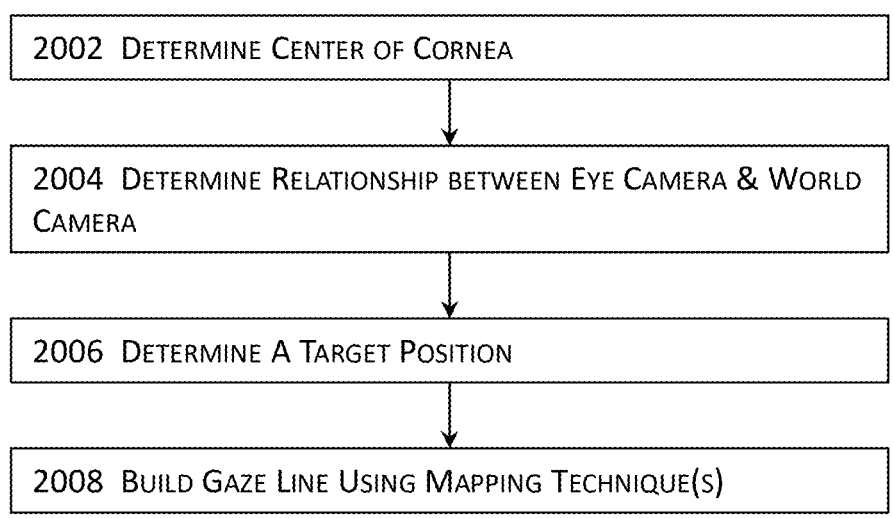
FIG. 20 illustrates an example, high-level block diagram of gaze tracking and identification of sighting center(s) according to one embodiment.

Referring now to FIG. 20, an example method 2000 of determining the gaze line is illustrated. First, at 2002, a center of the cornea may be determined (e.g., through the LED triangulation approach described above, etc.). Then, at 2004, a relationship between the eye cameras and world cameras may be determined. At 2006, a target position may be determined. Finally at 2008, mapping techniques may be utilized to build a gaze line based on all the determined information.

Figure 21:
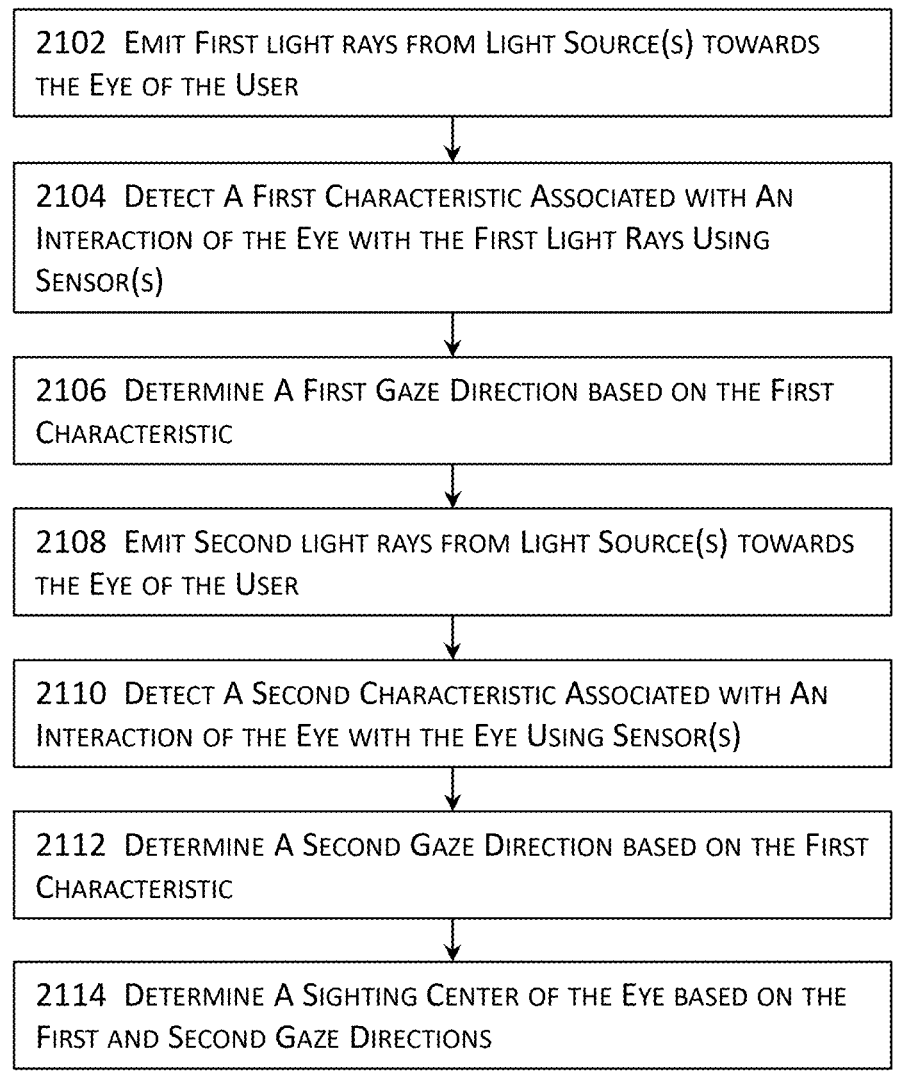
FIG. 21 illustrates a block diagram for a method or system for determining a sighting center using eye tracking techniques in some embodiments.

FIG. 21 illustrates a block diagram for a method or system for determining a sighting center using eye tracking techniques in some embodiments. In these embodiments, a plurality of first light rays or beams may be emitted from one or more light sources towards an eye of a user at 2102. In some of these embodiments, the one or more light sources may include an LED (light emitting diode) light source.

A first characteristic associated with an interaction of the eye with the first light rays or beams may be detected at 2104 using one or more sensors. In some embodiments, the one or more sensors include a photodiode. A first characteristic may include a return, a reflection, or a specific pattern in response to at least some of the first light rays or beams from the eye of the user and detected by the one or more sensors. A first gaze direction for the eye may be determined at 2106 based at least in part upon the first characteristic detected at 2104.

A plurality of second light rays or beams may be emitted from the one or more light sources towards the eye of the user at 2108. A second characteristic associated with an interaction of the eye with the second light rays or beams may be detected at 2110 using the one or more sensors. A second gaze direction for the eye may be determined at 2112 based at least in part upon the second characteristic detected at 2110. A sighting center of the eye may be determined at 2114 based at least in part upon the first gaze direction and the second gaze direction. It shall be noted that a similar process may be performed with respect to the other eye of the user to determine the corresponding sighting center of the other eye of the user in some of these embodiments.

Some of these embodiments assume both eyes of the user move in tandem and thus instrument only one eye, but not both eyes, of the user with the aforementioned one or more light sources and one or more sensors. Some other embodiments instrument both eyes of the user with the aforementioned one or more light sources and one or more sensors for each of the two eyes of the user.

In these latter embodiments, the respective sighting center of each of the two eyes of a user may be independently determined. In some of these embodiments, the respective sighting centers together with the respective gaze directions may be used to characterize focal depths, focal planes, vergence, accommodation, ranges of operations pertaining to a focal plane or focal depth, etc.

Figure 22:
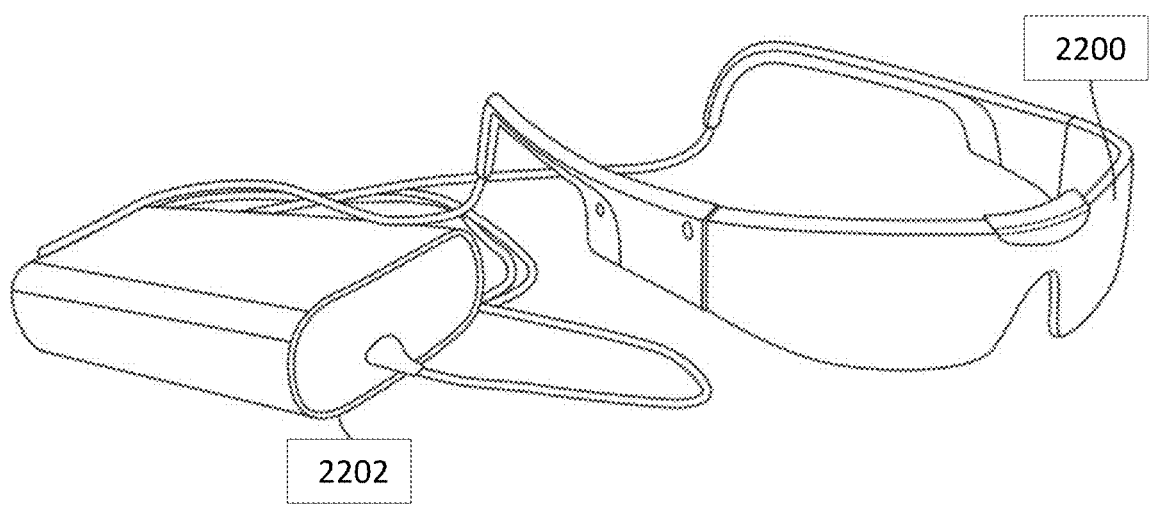
FIG. 22 illustrates a simplified, schematic of a wearable electronic device in some embodiments.

FIG. 22 illustrates a simplified, schematic of a wearable electronic device in some embodiments. As illustrated in FIG. 22, the audio transducers may integrate with the visual, for example each audio transducers supported from a common frame with the visual components. Alternatively, the audio transducers may be distinct from the frame that carries the visual components. For example, the audio transducers may be part of a belt pack, such as the one shown in FIG. 22 (2202).

As illustrated in FIG. 22, the augmented reality system 100 may include a distinct computation component (e.g., the processing sub-system 102 as shown in FIG. 22), separate from the head worn component (e.g., the optical sub-system 100 as shown in FIG. 22). The processing sub-system or computation component 102 may, for example, take the form of the belt pack, which can be convenience coupled to a belt or belt line of pants during use. Alternatively, the computation component 102 may, for example, take the form of a personal digital assistant or smartphone type device.

The computation component 102 may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The computation component 102 may include one or more nontransitory computer- or processor-readable media, for example volatile and/or nonvolatile memory, for instance read only memory (ROM), random access memory (RAM), static RAM, dynamic RAM, Flash memory, EEPROM, etc.

The computation component 102 may be communicatively coupled to the head worn component. For example, computation component 102 may be communicatively tethered to the head worn component via one or more wires or optical fibers via a cable with appropriate connectors. The computation component 102 and the head worn component 100 may communicate according to any of a variety of tethered protocols, for example UBS®, USB2®, USB3®, Ethernet®, Thunderbolt®, Lightning® protocols.

Alternatively or additionally, the computation component 102 may be wirelessly communicatively coupled to the head worn component. For example, the computation component 102 and the head worn component 100 may each include a transmitter, receiver or transceiver (collectively radio) and associated antenna to establish wireless communications there between. The radio and antenna(s) may take a variety of forms. For example, the radio may be capable of short-range communications, and may employ a communications protocol such as BLUETOOTH®, WI-FI®, or some IEEE 802.11 compliant protocol (e.g., IEEE 802.11n, IEEE 802.11a/c).

Figure 23:
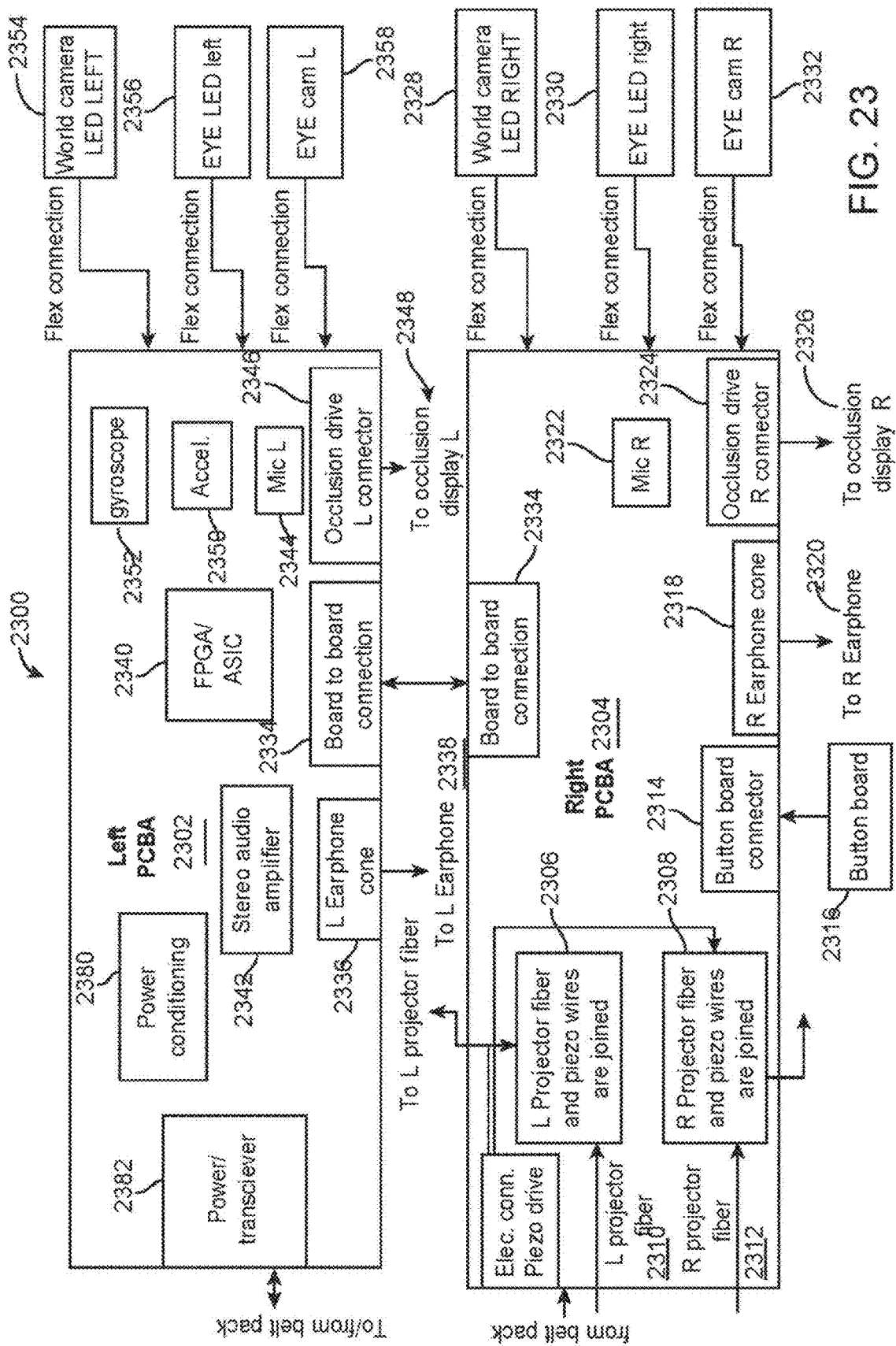
FIG. 23 shows an example architecture for the electronics for an augmented reality device, according to one or more illustrated embodiments.

FIG. 23 shows an example architecture for the electronics for an augmented reality device, according to one or more illustrated embodiments. The AR device may include one or more printed circuit board components, for instance left (2302) and right (2304) printed circuit board assemblies (PCBA). As illustrated, the left PCBA 2302 includes most of the active electronics, while the right PCBA 2304 supports principally supports the display or projector elements.

The right PCBA 2304 may include a number of projector driver structures which provide image information and control signals to image generation components. For example, the right PCBA 2304 may carry a first or left projector driver structure 2306 and a second or right projector driver structure 2308. The first or left projector driver structure 2306 joins a first or left projector fiber 2310 and a set of signal lines (e.g., piezo driver wires). The second or right projector driver structure 2308 joins a second or right projector fiber 2312 and a set of signal lines (e.g., piezo driver wires). The first or left projector driver structure 2306 is communicatively coupled to a first or left image projector, while the second or right projector drive structure 2308 is communicatively coupled to the second or right image projector.

In operation, the image projectors render virtual content to the left and right eyes (e.g., retina) of the user via respective optical components, for instance waveguides and/or compensation lenses.

The image projectors may, for example, include left and right projector assemblies. The projector assemblies may use a variety of different image forming or production technologies, for example, fiber scan projectors, liquid crystal displays (LCD), liquid crystal on silicon (LCOS) displays, digital light processing (DLP) displays. Where a fiber scan projector is employed, images may be delivered along an optical fiber, to be projected therefrom via a tip of the optical fiber. The tip may be oriented to feed into the waveguide. An end of the optical fiber with the tip from which images project may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Continuing with the right PCBA 2304, a button board connector 2314 may provide communicative and physical coupling to a button board 2316 which carries various user accessible buttons, keys, switches or other input devices. The right PCBA 2304 may include a right earphone or speaker connector 2318, to communicatively couple audio signals to a right earphone 2320 or speaker of the head worn component. The right PCBA 2304 may also include a right microphone connector 2322 to communicatively couple audio signals from a microphone of the head worn component. The right PCBA 2304 may further include a right occlusion driver connector 2324 to communicatively couple occlusion information to a right occlusion display 2326 of the head worn component. The right PCBA 2304 may also include a board-to-board connector to provide communications with the left PCBA 2302 via a board-to-board connector 2334 thereof.

The right PCBA 2304 may be communicatively coupled to one or more right outward facing or world view cameras 2328 which are body or head worn, and optionally a right cameras visual indicator (e.g., LED) which illuminates to indicate to others when images are being captured. The right PCBA 2304 may be communicatively coupled to one or more right eye cameras 2332, carried by the head worn component, positioned and orientated to capture images of the right eye to allow tracking, detection, or monitoring of orientation and/or movement of the right eye. The right PCBA 2304 may optionally be communicatively coupled to one or more right eye illuminating sources 2330 (e.g., LEDs), which as explained herein, illuminates the right eye with a pattern (e.g., temporal, spatial) of illumination to facilitate tracking, detection or monitoring of orientation and/or movement of the right eye.

The left PCBA 2302 may include a control subsystem, which may include one or more controllers (e.g., microcontroller, microprocessor, digital signal processor, graphical processing unit, central processing unit, application specific integrated circuit (ASIC), field programmable gate array (FPGA) 2340, and/or programmable logic unit (PLU)). The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 2302 may include a left earphone or speaker connector 2336, to communicatively couple audio signals to a left earphone or speaker 2338 of the head worn component. The left PCBA 2302 may include an audio signal amplifier (e.g., stereo amplifier) 2342, which is communicative coupled to the drive earphones or speakers. The left PCBA 2302 may also include a left microphone connector 2344 to communicatively couple audio signals from a microphone of the head worn component. The left PCBA 2302 may further include a left occlusion driver connector 2346 to communicatively couple occlusion information to a left occlusion display 2348 of the head worn component.

The left PCBA 2302 may also include one or more sensors or transducers which detect, measure, capture or otherwise sense information about an ambient environment and/or about the user. For example, an acceleration transducer 2350 (e.g., three axis accelerometer) may detect acceleration in three axes, thereby detecting movement. A gyroscopic sensor 2352 may detect orientation and/or magnetic or compass heading or orientation. Other sensors or transducers may be similarly employed.

The left PCBA 2302 may be communicatively coupled to one or more left outward facing or world view cameras 2354 which are body or head worn, and optionally a left cameras visual indicator (e.g., LED) 2356 which illuminates to indicate to others when images are being captured. The left PCBA may be communicatively coupled to one or more left eye cameras 2358, carried by the head worn component, positioned and orientated to capture images of the left eye to allow tracking, detection, or monitoring of orientation and/or movement of the left eye. The left PCBA 2302 may optionally be communicatively coupled to one or more left eye illuminating sources (e.g., LEDs) 2356, which as explained herein, illuminates the left eye with a pattern (e.g., temporal, spatial) of illumination to facilitate tracking, detection or monitoring of orientation and/or movement of the left eye.

The PCBAs 2302 and 2304 are communicatively coupled with the distinct computation component (e.g., belt pack) via one or more ports, connectors and/or paths. For example, the left PCBA 2302 may include one or more communications ports or connectors to provide communications (e.g., bi-directional communications) with the belt pack. The one or more communications ports or connectors may also provide power from the belt pack to the left PCBA 2302. The left PCBA 2302 may include power conditioning circuitry 2380 (e.g., DC/DC power converter, input filter), electrically coupled to the communications port or connector and operable to condition (e.g., step up voltage, step down voltage, smooth current, reduce transients).

The communications port or connector may, for example, take the form of a data and power connector or transceiver 2382 (e.g., Thunderbolt® port, USB® port). The right PCBA 2304 may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 2302 includes most of the active electronics, while the right PCBA 2304 supports principally supports the display or projectors, and the associated piezo drive signals. Electrical and/or fiber optic connections are employed across a front, rear or top of the body or head worn component of the AR system.

Both PCBAs 2302 and 2304 are communicatively (e.g., electrically, optically) coupled to the belt pack. The left PCBA 2302 includes the power subsystem and a high-speed communications subsystem. The right PCBA 2304 handles the fiber display piezo drive signals. In the illustrated embodiment, only the right PCBA 2304 needs to be optically connected to the belt pack. In other embodiments, both the right PCBA and the left PCBA may be connected to the belt pack.

While illustrated as employing two PCBAs 2302 and 2304, the electronics of the body or head worn component may employ other architectures. For example, some implementations may use a fewer or greater number of PCBAs. Also, for example, various components or subsystems may be arranged differently than illustrated in FIG. 23. For example, in some alternative embodiments some of the components illustrated in FIG. 23 as residing on one PCBA may be located on the other PCBA, without loss of generality.

In some embodiments, each user may use his/her own respective AR system (generally referred to as individual AR systems in the discussion below). In some implementations, the individual augmented reality systems may communicate with one another. For example, two or more proximately located AR systems may communicate with one another. As described further herein, communications may occur after performance of a handshaking protocol, in one or more embodiments. The AR systems may communicate wirelessly via one or more radios. As discussed above, such radios may be capable of short-range direct communications, or may be capable of longer-range direct communications (e.g., without a repeater, extender, etc.). Additionally or alternatively, indirect longer-range communications may be achieved via one or more intermediary devices (e.g., wireless access points, repeaters, extenders).

A head worn component of an XR system may have one or more "outward" facing cameras (e.g., 2328, 2354). In one or more embodiments, the head worn component may have one or more "inward" facing cameras. As used herein, "outward facing" means that the camera captures images of the ambient environment rather than the user who is wearing the head worn component. Notably, the "outward" facing camera could have a field of view that encompass areas to the front, the left, the right or even behind the user. This contrasts with an inward facing camera which captures images of the individual who is wearing the head worn component, for instance a camera that faces the user's face to capture facial expression or eye movements of the user.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art, each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allows for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The scope and breadth of the present invention are not to be limited to the examples provided and/or the subject specification, but rather only by the scope of claim language associated with this disclosure.

What is claimed is:

1. A system for displaying virtual contents using a wearable electronic device, comprising:
    a display device that presents virtual contents to a user;
    a microprocessor operatively coupled to display device; and
    memory storing a sequence of instructions which, when executed by the microprocessor, causes the microprocessor to perform a set of acts, the set of acts comprising:
        determining, by a wearable electronic device, a sighting center for a first eye of the user wearing the wearable electronic device;
        estimating, by the wearable electronic device or a remote computing device connected to the wearable electronic device via a network, an error or precision for the sighting center;
        determining a range of operation for a focal distance or a focal plane at the focal distance based at least in part upon the error or the precision and a criterion pertaining to vergence and accommodation of binocular vision of the virtual contents with the wearable electronic device;
        adjusting a virtual content into an adjusted virtual content for presentation with respect to the focal plane or the focal distance based at least in part upon the range of operation;
        determining whether a render position error or precision is to be updated based at least in part upon one or more criteria;
        estimating a first error or precision for the sighting center; and
        adjusting the range of operation into a smaller range of operation, wherein the smaller range of operation comprises a range of distances for the focal plane or the focal distance, and the virtual content with respect to the focal plane or the focal distance is rendered according to the smaller range of operation.

2. The system of claim 1, the memory storing the sequence of instructions which, when executed by the microprocessor, causes the microprocessor to perform the set of acts, the set of acts further comprising:
    identifying a characteristic of the first eye of the user, wherein the characteristic pertains to a disease of the eye of the user; and
    adjusting the sighting center based at least in part upon the characteristic of the first eye of the user.

3. The system of claim 1, the memory storing the sequence of instructions which, when executed by the microprocessor, causes the microprocessor to perform the set of acts, the set of acts further comprising:
    presenting the adjusted virtual content to the user at least by using the wearable electronic device that projects light beams pertaining to the adjusted virtual content with respect to the focal plane or the focal distance, wherein
    the error or the precision comprises at least one of a render camera position error or precision that is specific to the user and the wearable electronic device, a system-level error or precision specific to the wearable electronic device, or a population-level residual error pertaining to a plurality of users.

4. The system of claim 1, the memory storing the sequence of instructions which, when executed by the microprocessor, causes the microprocessor to perform the set of acts, the set of acts further comprising:

receiving a signal indicating a change in a relative position, movement, or motion between the wearable electronic device and the user;

determining a sighting center error or precision or a render camera position error or precision based at least upon the signal; and adjusting the range of operation based at least in part upon the sighting center error or precision or the render camera position error or precision.

5. The system of claim 4, wherein the set of acts comprises adjusting the range of operation based at least in part upon the sighting center error or precision or the render camera position error or precision, and adjusting the range of operation further comprising:

determining a render camera position for the first eye of the user at least by executing an eye tracking module of the wearable electronic device or by performing a visual task;

determining an estimated sighting center error or precision for the render camera position for the first eye of the user; and identifying the focal plane or the focal distance corresponding to a ground truth for a plurality of users.

6. The system of claim 5, wherein the set of acts comprises adjusting the range of operation based at least in part upon the sighting center error or precision or the render camera position error or precision, and adjusting the range of operation further comprising:

determining a residual error for the render camera position for the first eye of the user.

7. The system of claim 5, wherein the set of acts comprises adjusting the range of operation based at least in part upon the sighting center error or precision or the render camera position error or precision, and adjusting the range of operation further comprising:

adjusting the range of operation for the focal plane or the focal distance into an adjusted range of operation based at least in part upon the estimated sighting center error or precision.

8. The system of claim 1, wherein the set of acts comprising determining the sighting center for the first eye of the user wearing the wearable electronic device, and determining the sighting center comprises:

presenting a first marker at a first location to the first eye of the user, wherein the first marker comprises a first hole in an object or a first rendered object; and presenting a target to the first eye of the user at the focal plane or the focal distance.

9. The system of claim 8, wherein the set of acts comprising determining the sighting center for the first eye of the user wearing the wearable electronic device, and determining the sighting center comprises:

moving the target around the first marker;

receiving a first signal from the user when the target becomes visible by the first eye of the user; and upon receiving the first signal, determining a first reference entity connecting the first marker and the target.

10. The system of claim 9, wherein the set of acts comprising determining the sighting center for the first eye of the user wearing the wearable electronic device, and determining the sighting center comprises:

presenting a second marker at a second location to the first eye of the user, wherein the second marker comprises a second hole in the object or a second rendered object; and presenting the target or a separate target to the first eye of the user at the focal plane or the focal distance.

11. The system of claim 10, wherein the set of acts comprising determining the sighting center for the first eye of the user wearing the wearable electronic device, and determining the sighting center comprises:

moving the target or the separate target around the second marker;

receiving a second signal from the user when the target or the separate target becomes visible by the first eye of the user; and upon receiving the second signal, determining a second reference entity connecting the second marker and the target or the separate target.

12. The system of claim 11, wherein the set of acts comprising determining the sighting center for the first eye of the user wearing the wearable electronic device, and determining the sighting center comprises:

determining the sighting center for the first eye of the user based at least in part upon the first reference entity and the second reference entity.

13. A method for displaying virtual contents using wearable electronic device, comprising:

determining, by a wearable electronic device, a sighting center for a first eye of a user wearing the wearable electronic device;

estimating, by the wearable electronic device or a remote computing device connected to the wearable electronic device via a network, an error or precision for the sighting center;

determining a range of operation for a focal distance or a focal plane at the focal distance based at least in part upon the error or the precision and a criterion pertaining to vergence and accommodation of binocular vision of virtual contents with the wearable electronic device;

adjusting a virtual content into an adjusted virtual content for presentation with respect to the focal plane or the focal distance based at least in part upon the range of operation;

determining whether a render position error or precision is to be updated based at least in part upon one or more criteria;

estimating a first error or precision for the sighting center; and adjusting the range of operation into a smaller range of operation, wherein the smaller range of operation comprises a range of distances for the focal plane or the focal distance, and the virtual content with respect to the focal plane or the focal distance is rendered according to the smaller range of operation.

14. The method of claim 13, further comprising:

identifying a characteristic of the first eye of the user, wherein the characteristic pertains to a disease of the eye of the user;

adjusting the sighting center based at least in part upon the characteristic of the first eye of the user; and presenting the adjusted virtual content to the user at least by using the wearable electronic device that projects light beams pertaining to the adjusted virtual content with respect to the focal plane or the focal distance, wherein the error or the precision comprises at least one of a render camera position error or precision that is specific to the user and the wearable electronic device, a system-level error or precision specific to the wearable electronic device, or a population-level residual error pertaining to a plurality of users.

15. The method of claim 13, further comprising:
receiving a signal indicating a change in a relative position, movement, or motion between the wearable electronic device and the user;
determining a sighting center error or precision or a render camera position error or precision based at least upon the signal; and
adjusting the range of operation based at least in part upon the sighting center error or precision or the render camera position error or precision.

16. A computer program product comprising a non-transitory machine readable storage medium having stored thereupon a sequence of instructions which, when executed by a microprocessor, causes the microprocessor to perform a set of acts, the set of acts comprising:
determining, by a wearable electronic device, a sighting center for a first eye of the user wearing the wearable electronic device;
estimating, by the wearable electronic device or a remote computing device connected to the wearable electronic device via a network, an error or precision for the sighting center;
determining a range of operation for a focal distance or a focal plane at the focal distance based at least in part upon the error or the precision and a criterion pertaining to vergence and accommodation of binocular vision of the virtual contents with the wearable electronic device;
adjusting a virtual content into an adjusted virtual content for presentation with respect to the focal plane or the focal distance based at least in part upon the range of operation;
determining whether a render position error or precision is to be updated based at least in part upon one or more criteria;
estimating a first error or precision for the sighting center; and
adjusting the range of operation into a smaller range of operation, wherein the smaller range of operation comprises a range of distances for the focal plane or the focal distance, and the virtual content with respect to the focal plane or the focal distance is rendered according to the smaller range of operation.

17. The computer program product of claim 16, the non-transitory machine readable storage medium having stored thereupon the sequence of instructions which, when executed by the microprocessor, causes the microprocessor to perform the set of acts, the set of acts further comprising:
presenting a first marker at a first location to the first eye of the user, wherein the first marker comprises a first hole in an object or a first rendered object;
presenting a target to the first eye of the user at the focal plane or the focal distance;
moving the target around the first marker;
receiving a first signal from the user when the target becomes visible by the first eye of the user; and
upon receiving the first signal, determining a first reference entity connecting the first marker and the target.

18. The computer program product of claim 17, the non-transitory machine readable storage medium having stored thereupon the sequence of instructions which, when executed by the microprocessor, causes the microprocessor to perform the set of acts, the set of acts further comprising:
presenting a second marker at a second location to the first eye of the user, wherein the second marker comprises a second hole in the object or a second rendered object;
presenting the target or a separate target to the first eye of the user at the focal plane or the focal distance;
moving the target or the separate target around the second marker; receiving a second signal from the user when the target or the separate target becomes visible by the first eye of the user;
upon receiving the second signal, determining a second reference entity connecting the second marker and the target or the separate target; and
determining the sighting center for the first eye of the user based at least in part upon the first reference entity and the second reference entity.

* * * * *